United States Patent [19]
Richards

[11] Patent Number: 6,000,513
[45] Date of Patent: Dec. 14, 1999

[54] ROTATIONAL OUTPUT CONTROL SYSTEM

[76] Inventor: James L. Richards, 162 Gordon Creek Rd., Boulder, Colo. 80302

[21] Appl. No.: 08/818,095

[22] Filed: Mar. 14, 1997

[51] Int. Cl.[6] ................................................. F16D 31/04
[52] U.S. Cl. ............................................................ 192/61
[58] Field of Search .................................. 192/61; 188/292

[56] References Cited

U.S. PATENT DOCUMENTS

| 1,450,679 | 4/1923 | Grafenstatt | 192/61 |
| 2,420,305 | 5/1947 | Donahew et al. | 192/61 |
| 2,704,141 | 3/1955 | Doshier | 192/61 |
| 2,839,889 | 6/1958 | McGill | 192/61 X |
| 2,961,483 | 1/1960 | Colmerauer | 192/61 X |

*Primary Examiner*—Richard M. Lorence
*Attorney, Agent, or Firm*—Lyon & Lyon LLP

[57] ABSTRACT

A gear pump mechanism shown in a variety of applications to control rotational output. Control of the output from the gear pump and feed to the gear pump of hydraulic fluid or oil can be controlled to establish conditions from free wheeling to fully locked. The gear pump includes a sun gear and planetary gears. The sun gear is attached to an output shaft while the planetary gears are rotatably mounted to the pump housing. Through rotation of the housing and control of the flow through the gear pump, relative rotation of the output shaft can be determined. Applications of rotational output control systems using the gear pump mechanism provide adjustable torque limiters, variable rate clutches, differentials, brakes, CVT transmissions, four wheel drive systems and forward and reverse variable rate clutches with no gear backlash.

44 Claims, 18 Drawing Sheets

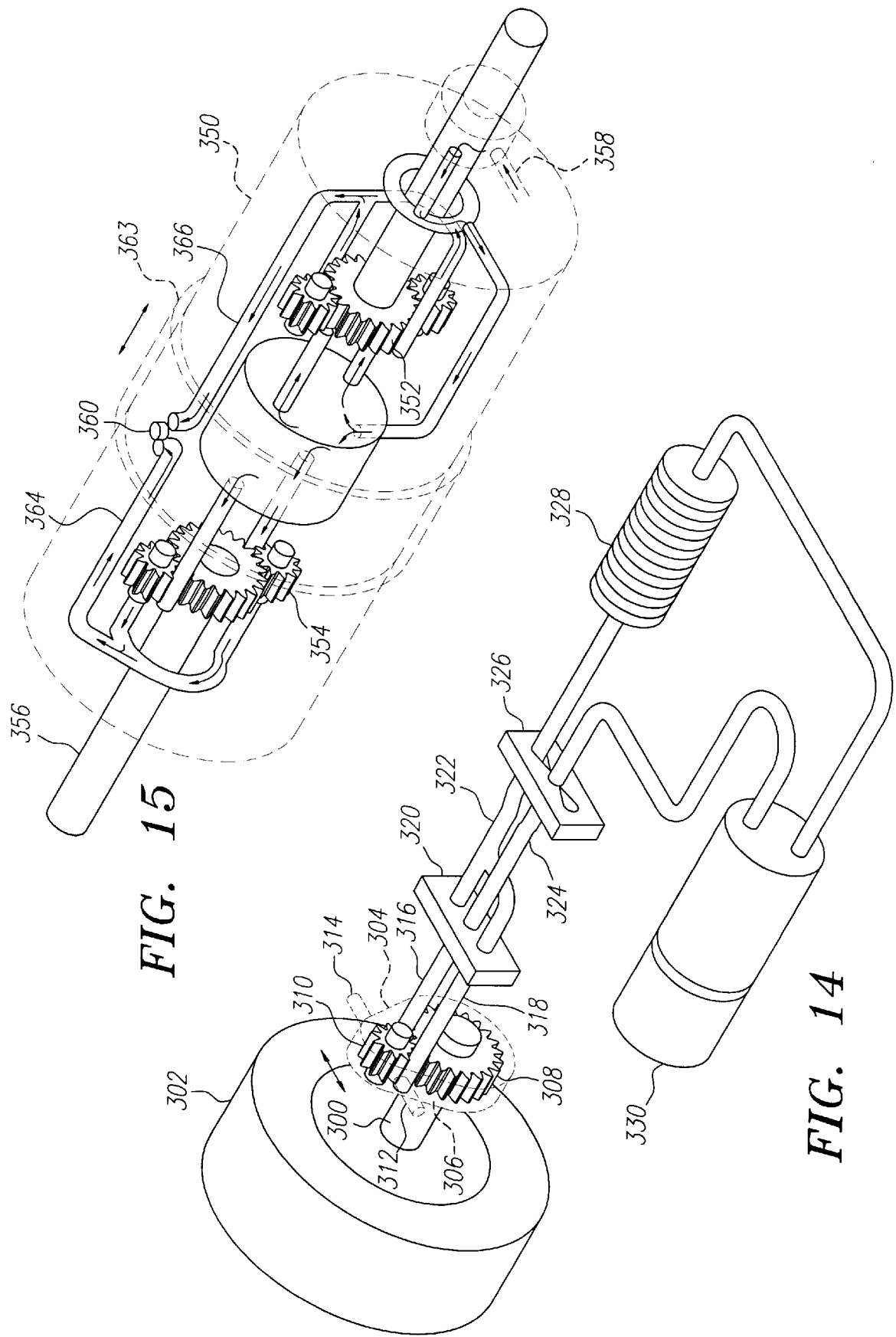

ROTATIONAL OUTPUT CONTROL SYSTEM

BACKGROUND OF THE INVENTION

The field of the present invention is mechanisms for controlling and transmitting rotational motion and power.

Mechanisms for controlling rotational output using a fluid as a force transmitting means have been widely used as fluid couplings. Other designs are known where pumps generate fluid pressure and flow which is then converted to rotational output through fluid motors. Continuously variable ratios are even possible with some systems.

A difficulty with the use of fluid for power transmission is that fluid flow can introduce substantial inefficiencies to such systems. Efforts have been made to reduce such losses by increasing the pressure with a corresponding decrease in flow rate. However, by increasing the pressure, leakage and/or cost can become a significant factor.

Techniques are also known for mechanically locking up couplings once velocities across the coupling are matched. By augmenting the system with a mechanical lock, fluid losses can be greatly reduced.

Gear pumps are also well known. Such pumps typically include a gear set. An inlet provides fluid in the area of the pinch where the gear wheels are separating. An outlet is provided to the other side of the pinch where the gear wheels are coming into engagement. Such pumps are frequently used for system lubrication and the like.

SUMMARY OF THE INVENTION

The present invention is directed to mechanical systems for controlling the rotational output of a driving element and applications thereof.

Regarding the mechanical systems, a gear pump is employed with at least one gear set including at least one gear wheel mounted to the inlet and at least one gear wheel mounted to the outlet. A fluid circuit associated with the gear pump selectively controls flow from the output of the gear pump. With such control, the pump may be configured to be effectively locked up, disengaged, controlled by the fluid circuit to provide degrees of torque transfer between the input and the output and/or combinations thereof.

Accordingly, a first, separate aspect of the present invention is to provide a rotational output control system employing a gear pump and a fluid circuit with valve control of the fluid circuit to selectively lock the inlet and outlet together.

A second, separate aspect of the present invention is to provide a rotational output control system employing a gear pump and a fluid circuit with the fluid circuit including valving elements associated with each of the input and the output. In addition to locking up the device through closure of the output valve element, closure of the input valve element can starve the gear pump and effect an uncoupled system.

A third, separate aspect of the present invention is to provide a structure in association with either the first or the second aspect. The structure includes a housing having a body with a cavity open at one end and closed by a cap. One of the gear wheels of the gear pump is rotatably mounted to the housing while the other is fixed to a shaft.

In a fourth, separate aspect of the present invention, a rotational output control system is contemplated which has a gear pump and a fluid circuit contained within a housing. A gear wheel is associated with a shaft rotatably mounted relative to the housing. Multiple planetary gear wheels mesh with the gear wheel fixed to the shaft. Inlets and outlets are positioned adjacent each meshing point of the planetary gears with the gear wheel on the shaft.

Accordingly, it is an object of the present invention to provide rotational output control systems using the fluid circuit control of gear pumps to define operation.

Regarding applications of the rotational output control systems, use of multiple such devices, special arrangements and attachments can provide a variety of useful devices and applications.

In a fifth, separate aspect of the present invention, a rotational output control system includes a plurality of gear pumps with one gear pump providing pressurized fluid to a plurality of gear pumps driven by the pressure. The driven pumps include one-way clutches. A fluid circuit includes valving to selectively close inputs to the driven pumps. A progressive ratio transmission is thus defined.

In a sixth, separate aspect of the present invention, attachment of the housing of a rotational output control system may provide utility. When fixed, a brake mechanism is provided. When rotationally mounted in a drive train, a clutch or limited slip mechanism results. When combined in a housing with a second rotational output control system and coupled by multiple gear sets, a forward/reverse variable speed clutch may be defined without backlash during reversal.

In a seventh, separate aspect of the present invention, the housings of multiple rotational output control systems may be combined to provide differential drive. A drive shaft may include one or more rotary clutches to selectively control axle shafts which can extend to wheel discs.

In a eighth, separate aspect of the present invention, rotational output control systems may replace complicated mechanisms for multi wheel drive control.

In a ninth, separate aspect of the present invention, rational combinations of the foregoing are contemplated.

Accordingly, it is an object of the present invention to provide applications of a rotational output control system which can particularly use characteristics thereof to advantage. Other and further objects and advantages pertaining to such applications will appear hereinafter.

BRIEF DESCRIPTION OF THE DRAWINGS

FIG. 14 is a schematic prospective view of a brake.

FIG. 15 is a schematic prospective view of a differential.

DETAILED DESCRIPTION OF THE PREFERRED EMBODIMENTS

Figure 1:
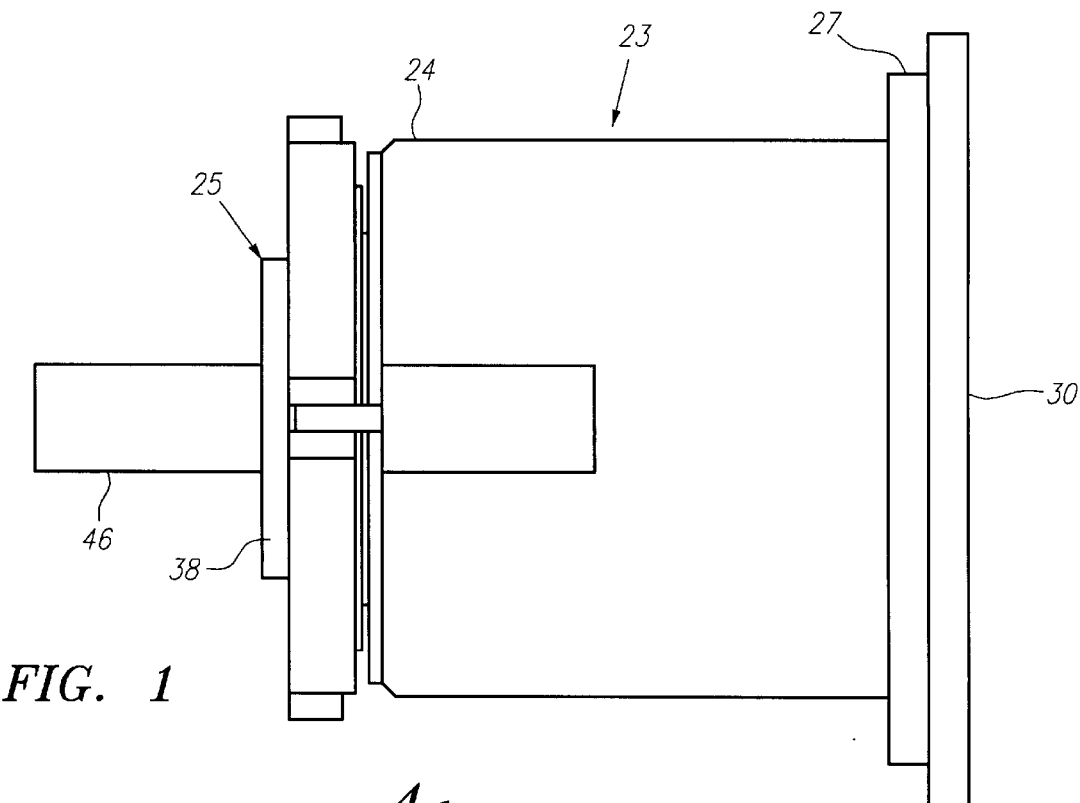
FIG. 1 is a side view of a variable rate clutch.
Figure 2:
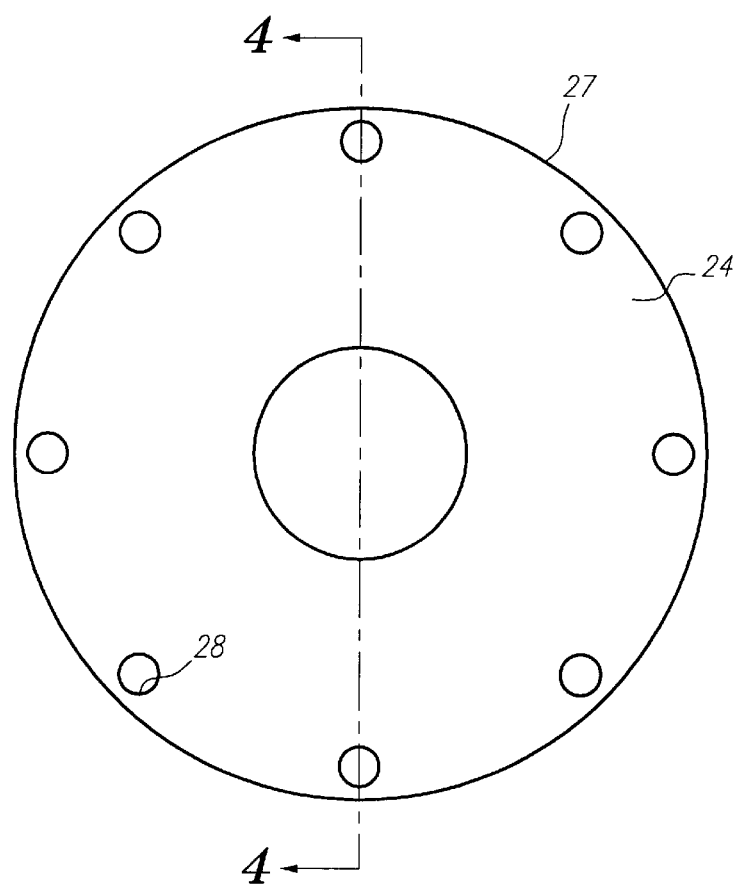
FIG. 2 is the drive side end view of the clutch of FIG. 1.
Figure 3:
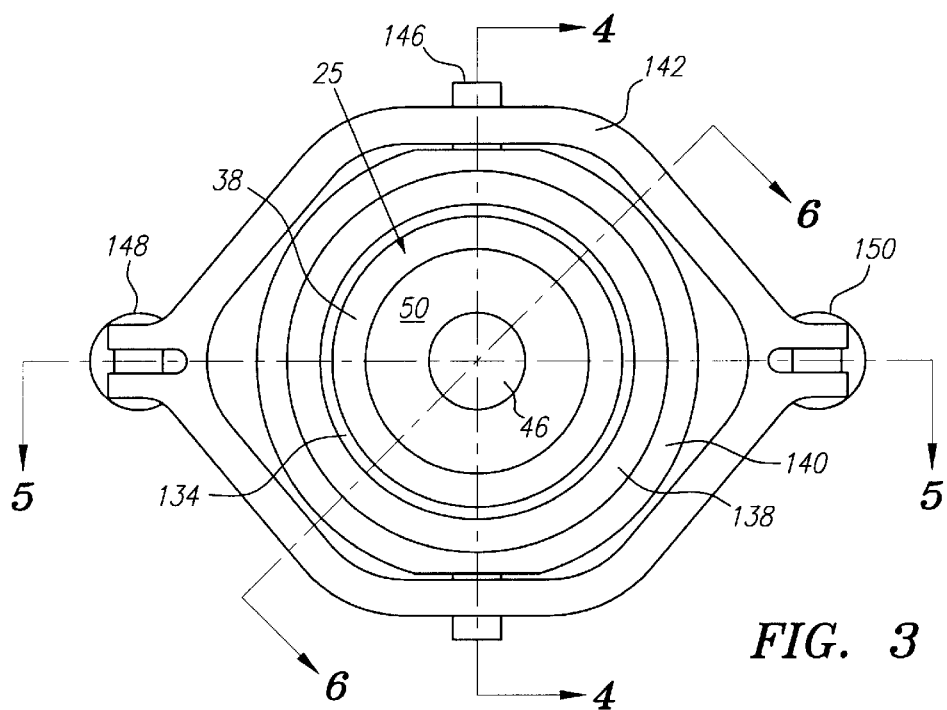
FIG. 3 is the driven side end view of the clutch of FIG. 1.
Figure 4:
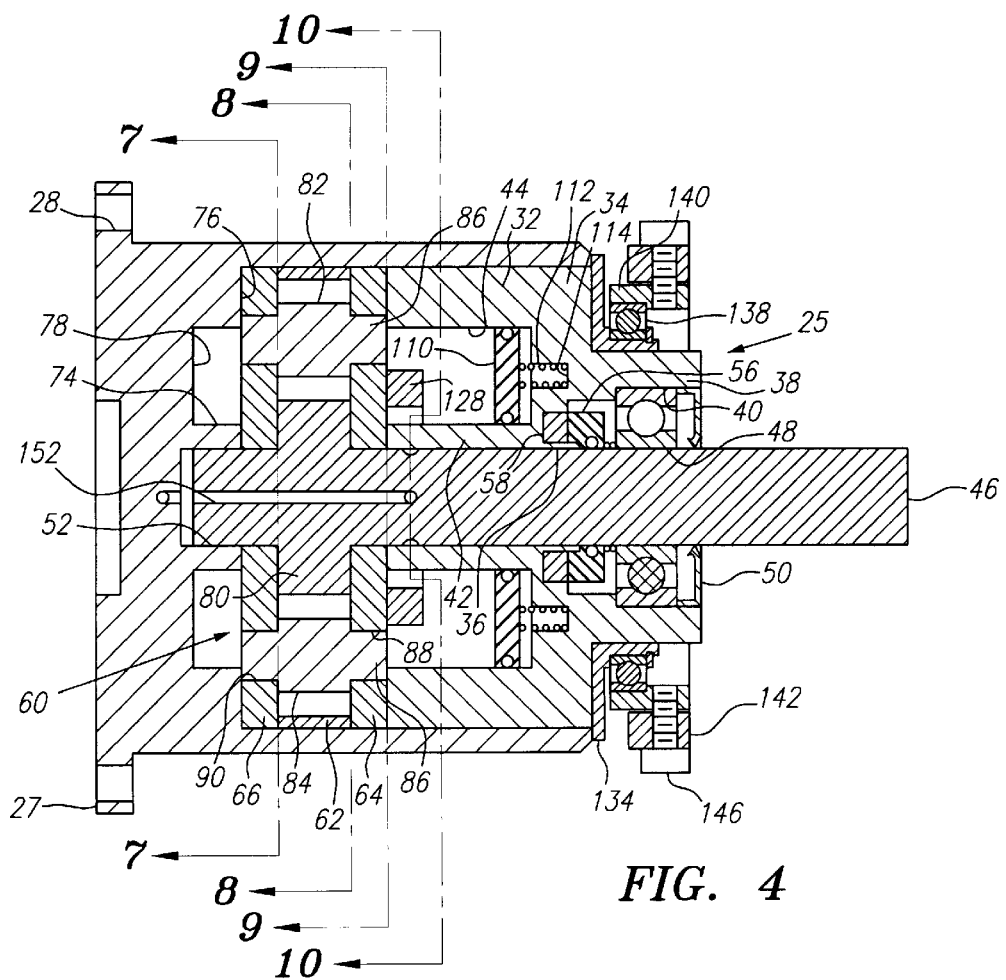
FIG. 4 is a cross-sectional side view taken along line 4—4 of FIG. 3.

Turning first to the variable rate clutch illustrated in FIGS. 1 through 10, a housing, generally designated 23 is illustrated as including a body 24 and a housing closure, generally designated 25. Bolts 26 retain the housing 23 together. Eight such bolts 26 are illustrated which extend through the housing closure 25 into the body 24. The body 24 includes a mounting flange 27 having mounting holes 28 equiangularly placed about the flange 27. The mounting flange 27 is for attachment to a rotatable drive, schematically illustrated at 30. The body 24 is substantially cylindrical to provide a cavity having an opening at one end. This opening is closed by the housing closure 25.

The housing closure 25 includes an annular rim 32 which is cylindrical to fit within the body 24. A central hub 34 includes a central opening 36 and extends outwardly to the annular rim 32. A circular flange 38 extends in the opposite direction to the annular rim 32 to define a bearing cavity 40. Extending from the central hub 34 in the same direction as the annular rim 32 is an inner sleeve 42. An annular reservoir 44 is thus defined between the annular rim 32 and the inner sleeve 42. The inner sleeve 42 provides an extension of the central opening 36 as well.

An output shaft 46 extends through the central opening 36 in the central hub 34 and the inner sleeve 42. The shaft 46 is rotatably mounted by a bearing 48 positioned within the bearing cavity 40. A bearing cover 50 closes the outward end of the bearing cavity 40. A journal cavity 52 is provided in the end wall of the body 24 to receive the end of the shaft 46. A carbide-graphite seal is positioned inwardly of the bearing 48 within the bearing cavity 40. The graphite ring 56 rotates with the shaft 46. The carbide ring 58 rotates with the central hub 34 of the housing closure 25.

Figure 8:
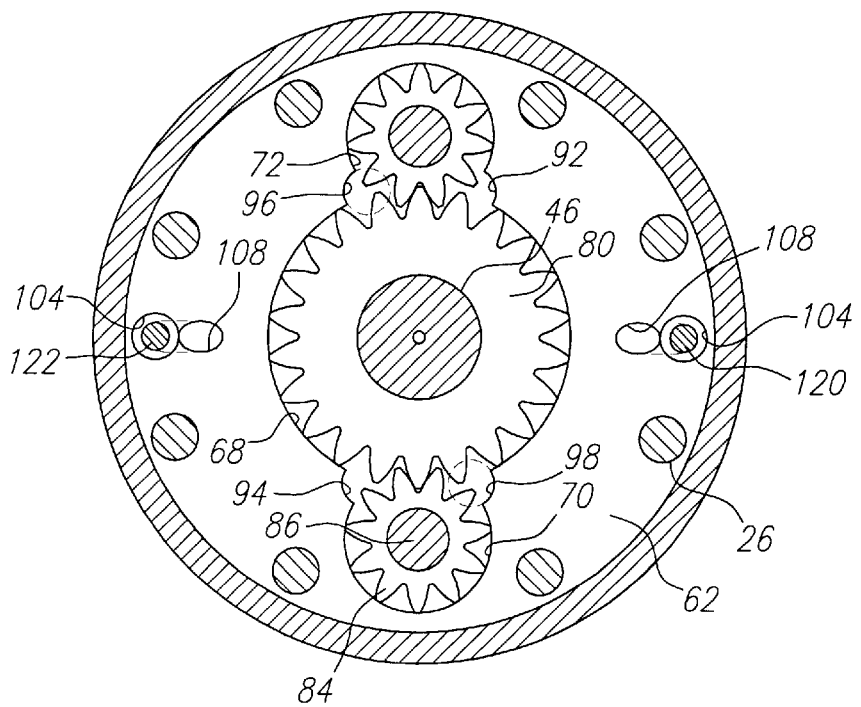
FIG. 8 is a cross-sectional side view taken along line 8—8 of FIG. 4.
Figure 9:
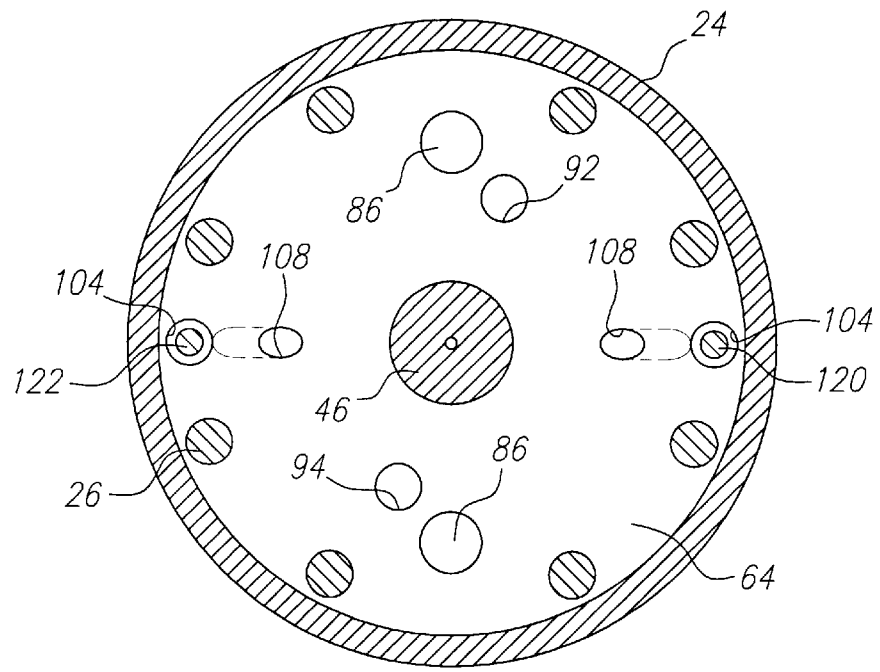
FIG. 9 is a cross-sectional side view taken along line 9—9 of FIG. 4.
Figure 10:
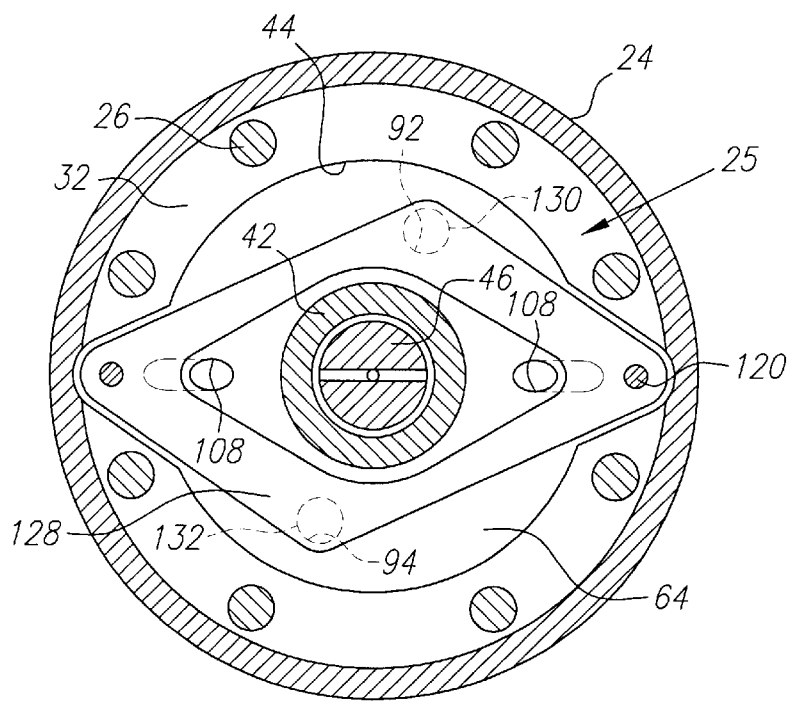
FIG. 10 is a cross-sectional side view taken along line 10—10 of FIG. 4.

A gear pump, generally designated 60, is positioned within the cavity of the body 24. The pump 60 includes a pump body defined by a body plate 62, an inlet side plate 64 and an outlet side plate 66. Each of the plates 62, 64 and 66 have a cylindrical periphery to fit closely within the interior wall of the body 24. The body plate 62 is best illustrated in FIG. 8. Adjoining circular cavities 68, 70 and 72 provide space for the gear wheels. The fit of the plates 62, 64 and 66 about the cavity 68, 70 and 72 is as precise as possible for commercial production so as to prevent flow bypass within the pump 60. The plates 64 and 66 are held against the body plate 62 in compression by the housing 23. An inner circular sleeve 74 and an outer circular step 76 extend from the end wall of the body 24 to form a support plane for the outlet side plate 66. An annular outlet reservoir 78 is defined therebetween. Similarly, the inner sleeve 42 and the annular rim 32 extend to the inlet side plate 64. The assembly bolts 26 compress the housing closure 25 into the body 24 which in turn compresses the plates 62, 64 and 66 together both at the outside periphery and at the inner diameter around the shaft 46.

The gear pump 60 includes a central gear wheel or sun gear 80 mounted to the shaft 46. The gear wheel 80 is fixed to the shaft 46 to rotate therewith. There are two outer gear wheels or planet gears 82 and 84 which are engaged with the central gear wheel 80. The outer gear wheels 82 and 84 are rotatably mounted to the housing 23 through the inlet side plate 64 and outlet side plate 66. Trunions 86 extend axially from the outer gear wheels 82 and 84 to journals 88 and 90 in the inlet side plate 64 and outlet side plate 66, respectively. The two outer gear wheels 82 and 84 are shown conveniently to be placed diametrically about the central gear wheel 80.

The fluid circuit of the clutch includes a gear pump inlet defined by two inlet passages 92 and 94. These inlet passages 92 and 94 extend through the inlet side plate 64 to adjacent the pinch areas between the central gear wheel 80 and the outer gear wheels 82 and 84, respectively. The inlet passages 92 and 94 are located to the side of the pinch areas where the gear teeth are disengaging from being meshed together as the gear wheels rotate.

A gear pump outlet includes two outlet passages 96 and 98. These outlet passages 96 and 98 pass outwardly through the outlet side plate 66 adjacent the pinch areas where the gear wheels are entering into meshing engagement. FIG. 8 also illustrates that some cavity space is provided for flow axially of the gear wheels at both sides of the pinch in the plate 62. These areas are in communication with either the inlet or outlet passages and form a part thereof. The gear pump outlet further includes the annular outlet reservoir 78 which is shown to have a fixed volume and, when filled with incompressible fluid, simply acts as a combined conduit or manifold as part of the outlet passages 96 and 98.

Further components of the gear pump outlet include two passages which extend through the pump body between the annular outlet reservoir 78 and the annular reservoir 44. These passages effectively form a further part of the outlet passages 96 and 98 and each include a hole 104 drilled normally through the body plate 62 and diagonal holes 106 and 108 extending through the outlet side plate 66, the inlet side plate 64, respectively, and partially through the body plate 62 into communication with the hole 104. Thus, the pump has a fluid circuit including the reservoir 44, the pump inlet including the inlet passages 92 and 94, the gear pump 60, the pump outlet including the outlet passages 96 and 98, the annular outlet reservoir 78, and the passages returning to the reservoir 44, in turn including the holes 104, 106 and 108.

Included as part of the fluid circuit in the reservoir 44 is a resiliently biased piston 110. This piston 110 is annular to accommodate the shape of the annular reservoir 44. The piston 110 is resiliently biased by springs 112 positioned uniformly about the housing closure 25, extending from cavities 114 to press against the piston 110. Seals are positioned around the inner and outer periphery of the piston 110 to prevent fluid from migrating to the back side of the piston. The resiliently biased piston 110 provides a small amount of pressure, two to three PSI is believed appropriate to insure proper operation of the fluid system. Rather than including a piston within the reservoir 44, a remote piston in a reservoir which is in communication with the annular reservoir 44 may also be employed. Further, rather than a piston, a compressible fluid or a fluid head may be used to create the appropriate pressure. Any of these mechanisms makes the reservoir variable volume.

Oil or hydraulic fluid is contemplated for the clutch. These fluids are incompressible. Considerations to the selection of the appropriate fluid and its viscosity include the amount of friction created as a result of viscosity, the need for lubrication, the amount of bypass flow resulting from lack of viscosity and the reaction to anticipated heat generated through use of the system.

A valve system controls the variable rate clutch in a range from complete disengagement to full engagement. The valve system is arranged within two bores 115 and 116. These bores 115 and 116 extend from one end of the housing through the housing closure 25 and into the body 24. Valve elements defined as piston control valves 117 and 118 control flow from the outlet of the gear pump. These valve elements 117 and 118 are positioned in the holes 104 forming part of the bores 115 and 116 and are slidably arranged such that they can move to completely uncover, partially cover or fully cover the diagonal holes 106. In doing so, the passages returning to the reservoir 44 can be controlled. It can be seen that the valve elements 117 and 118 have valve stems 120 and 122, respectively. The stems are of smaller cross section so that when the valve pistons 117 and 118 are displaced from the diagonal holes 106, flow can pass into the holes 104 and out through the diagonal holes 108. Thus, through manipulation of the valve pistons 117 and 118, control over the output of the gear pump 60 can be achieved.

The valve stems 120 and 122 are associated with sliding actuator elements 124 and 126, respectively. These elements are also linked with a block-off plate 128 employing two valve elements 130 and 132. The valve elements 130 and 132 are positioned over the inlet passages 92 and 94 extending through the inlet side plate 64, respectively. The block-off plate 128 is able to move with the sliding actuator elements 124 and 126 so as to extend to cover or withdraw to uncover the two inlet passages 92 and 94. As the valve elements 117 and 118 and the valve elements 130 and 132 are both associated with the sliding actuator elements 124 and 126, the gear pump inlet is open when the gear pump outlet is closed and visa versa. Gradations from those two extreme conditions are also available.

Figure 5:
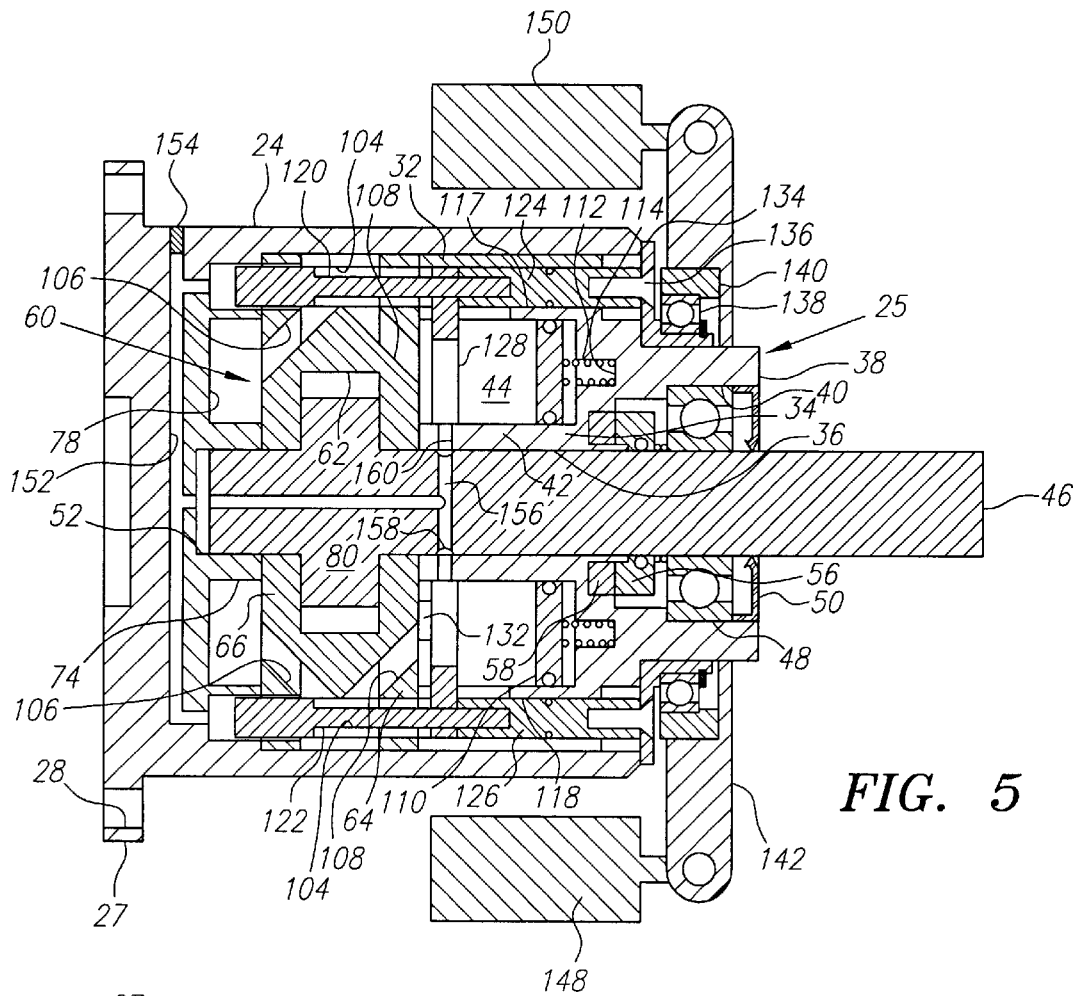
FIG. 5 is a cross-sectional side view taken along line 5—5 of FIG. 3.
Figure 6:
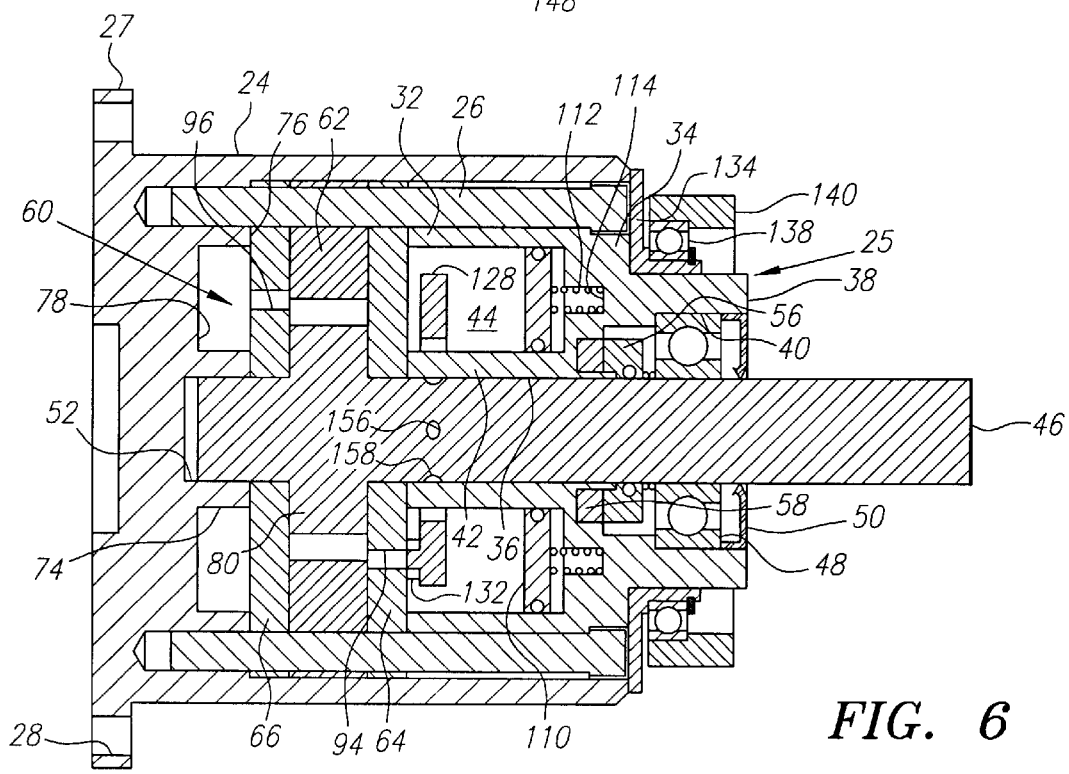
FIG. 6 is a cross-sectional side view taken along line 6—6 of FIG. 3.
Figure 7:
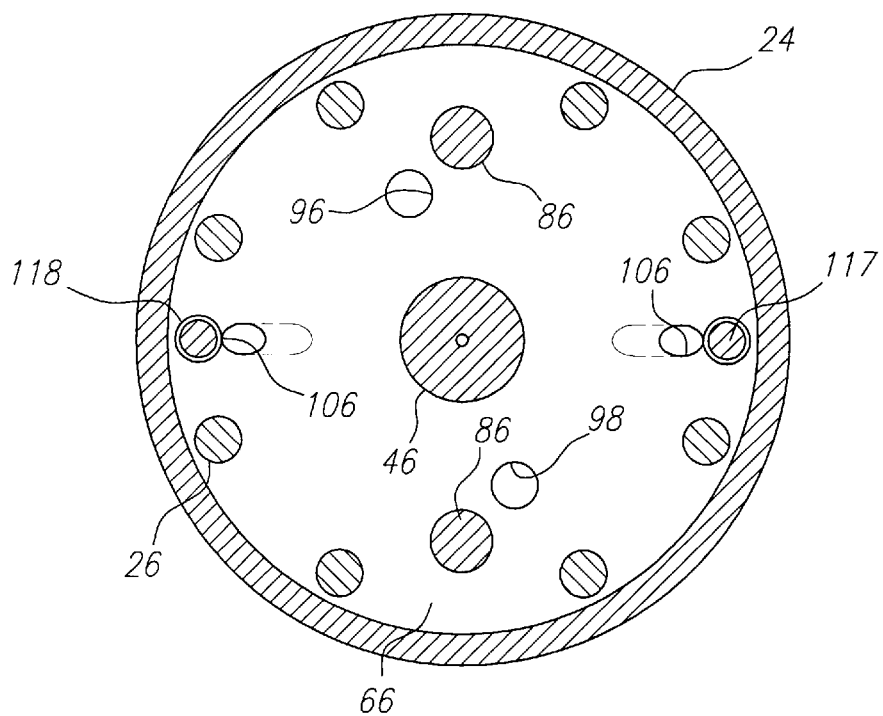
FIG. 7 is a cross-sectional side view taken along line 7—7 of FIG. 4.

A valve actuator system is associated with the sliding actuator elements 124 and 126 and arranged substantially outwardly of the housing 23. A slide ring 134 is slidably arranged on the outer periphery of the circular flange 38 on the housing closure 25. As seen in FIG. 5, the slide ring 134 is fastened by screws 136 to the sliding actuator elements 124 and 126. The slide ring 134 is able to move axially relative to the housing 23 but is unable to rotate relative to the housing 23. A slide bearing 138 is positioned on the slide ring 134. A ring 140 is mounted to the outer periphery of the slide bearing 138. Thus, the ring 140 is able to move with the slide ring 134 axially and is able to rotate relative to the slide ring 134 because of the bearing 138. The ring 140 is mounted to a gimbal ring 142 by trunions 146. The gimbal ring 142 is in turn mounted to drivers 148 and 150 schematically illustrated in FIG. 5. These drivers may conveniently be solenoids which have two positions each. The drivers are fixed to the body of the vehicle or other device upon which the clutch is mounted. The drivers 148 and 150 are arranged such that they are equidistant between the trunions 146 to accommodate pivotal movement of the gimbal ring 142 relative to the ring 140.

Looking to the operation of this variable rate clutch as illustrated in FIGS. 1 through 10, the clutch housing 23 may be affixed to a flywheel 30 of an engine or other drive mechanism. Thus, the housing 23 rotates with the input. The output shaft 46 might be attached to an output drive line, drive shaft, pulley or the like to convey rotational power as needed. The valve actuator system includes the drivers 148 and 150 which are affixed to the supporting frame of a vehicle, stationary equipment or the like. Assuming the solenoid drivers 148 and 150 are off, the valve actuator system is pulled against the housing 23. In this state, the valve elements 117 and 118 are positioned to open the exhaust passages. Further, the valve elements 130 and 132 on the block-off plate 128 close off the inlet passages 92 and 94. With the valve system in this configuration, substantially all incompressible fluid is pumped out of the gear pump 60. The inlet is closed and the outlet is fully open. As there is a void generated by the pump, the volume required within the housing 23 is increased. This volume change is accommodated by the resiliently biased piston 110. The clutch becomes completely disengaged and very little torque is transferred to the output shaft 46.

With both solenoid drivers 148 and 150 activated, the valve actuator system moves the valve system into an orientation where the valve elements 117 and 118 fully close off the exhaust passages by closing the holes 104. Further, the block-off plate 128 is moved such that the valve elements 130 and 132 fully open the inlet passages 92 and 94. In this circumstance, a full supply of incompressible fluid is provided to the gear pump 60. At the same time, the output from the gear pump is fully closed. As a result, the gear pump 60 effectively stalls. The output shaft 46 is caused to rotate with the housing 23 with very little flow taking place and only then through leakage paths within the gear pump. The clutch is fully engaged.

An intermediate position of the clutch is also possible. This is presented through the activation of only one of the solenoid drivers 148 or 150. In this circumstance, the valve system is moved approximately one-half the full stroke length allowing partial flow from the output side of the gear pump 60. Some torque is, therefore, transmitted from the housing 23 through the gear pump 60 and to the output shaft 46. Naturally, more sophisticated drivers 148 and 150 can provide additional intermediate positions. Further, the configuration of the valve elements and the inlet and outlet passageways can be varied to alter and provide more control over the performance of the valving system.

The clutch assembly is constructed in a way to reduce bypass flow. The resiliently biased pistons 110 are located in the low pressure reservoir 44. The shaft 46 also exits the housing 23 at the end most adjacent the low pressure side of the system as does the valve actuator apparatus. A high pressure relief passage 152 is arranged to provide relief to the valve pistons 117 and 118. This high pressure relief passage 152 is drilled into the housing 23 behind the ends of the bores 115 and 116. A plug 154 closes the passage 152 at the periphery of the housing. The passage 152 extends to the ends of the bores 115 and 116 such that pressure is relieved from the end of the pistons 117 and 118. The passage 152 also extends axially up the shaft 46. One or more diametrical passages 156 connect the end of the relief passage 152 to the periphery of the output shaft 46. The shaft 46 also has an annular groove 158 associated with the diametrical passage 156. Finally, ports 160 through the sleeve 42 vent the relief passage 152 into the low pressure annular reservoir 44. Circular seals are provided around the sliding actuator elements 124 and 126 to prevent the low pressure incompressible fluid to pass along the bores 115 and 116 from the housing 23.

Figure 11:
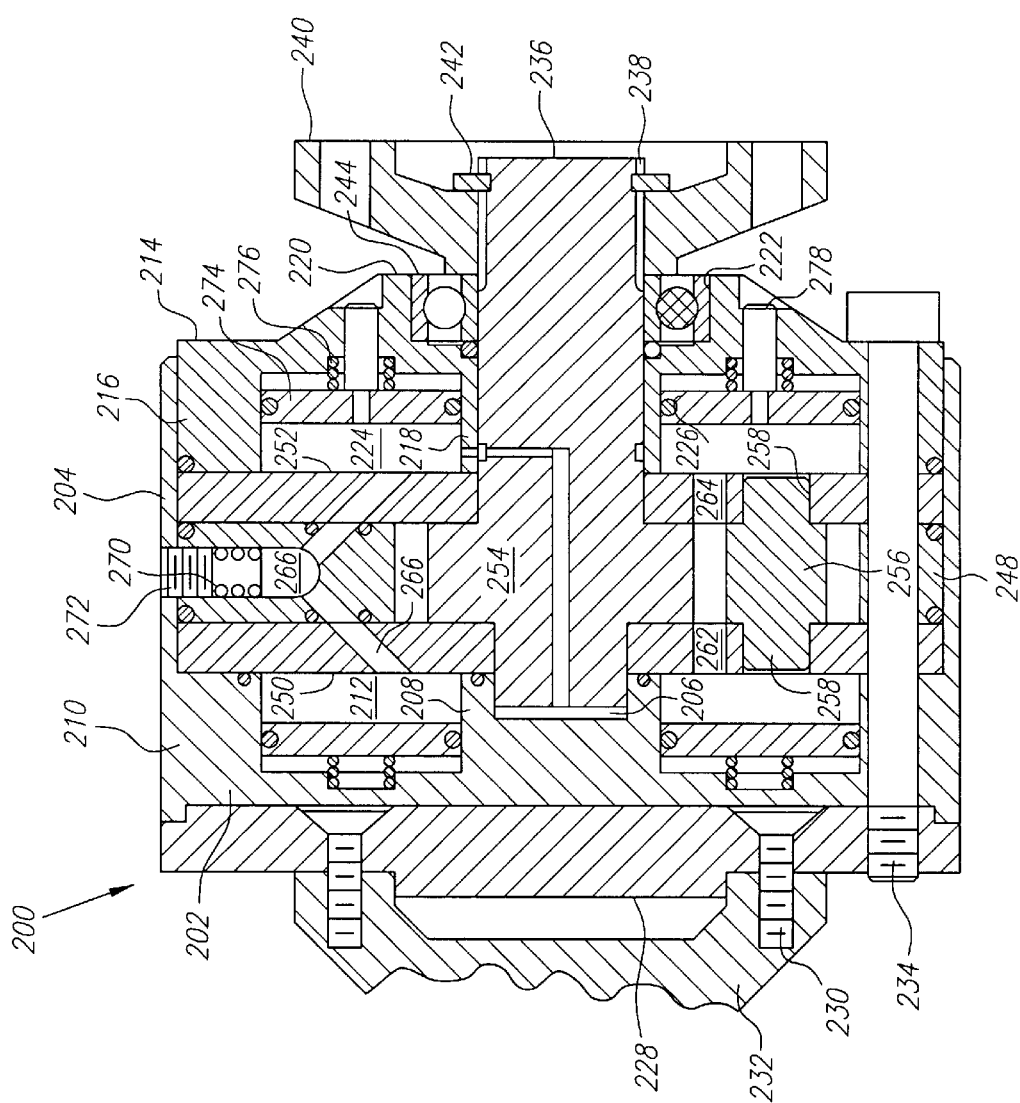
FIG. 11 is a schematic cross-sectional view of a twoway torque limiter.

Turning to the two-way torque limiter illustrated in FIG. 11 in schematic format, the housing, generally designated 200, includes a body 202 with a cylindrical sidewall 204 and an interior cavity open at one end. At the closed end of the body 202, a journal cavity 206 is defined by an inner circular sleeve 208. An outer circular step 210 defines, with the end of the inner circular sleeve 208, a flat surface to receive the mechanisms to be positioned within the housing 200. Between the inner circular sleeve 208 and the outer circular step 210, an annular cavity is defined which provides a reservoir 212.

Positioned in the open end of the body 202 is a housing closure 214. The housing closure is substantially circular so as to slide into the substantially cylindrical sidewall 204. The housing closure 214 includes an outer annular rim 216 and an inner circular sleeve 218. A hub 220 includes a bearing cavity 222 facing outwardly of the housing 200. An annular chamber is defined between the outer annular rim 216 and the inner circular sleeve 218 which forms a reservoir 224. The rim 216 and the sleeve 218 define a surface at the ends thereof used to enclose mechanisms contained within the housing 200. A central bore 226 extends through the inner circular sleeve 218.

A mounting plate 228 is located at the closed end of the housing. Fasteners 230 extend through the mounting plate 228 to mount a preceding or subsequent element 232 in the drive line. Bolts 234 extend through the outer annular rim 216 of the housing closure 214 and the outer circular step 210 of the body 202 to thread into the mounting plate 228. The entire housing assembly is drawn into compression by the bolts 234.

A shaft 236 extends through the central bore 226 in the housing closure 214. Splines 238 are arranged on the portion of the shaft 236 extending outwardly from the housing 200. A mounting hub 240 mates with the splines to fix the hub 240 to the shaft 236. A spring retainer 242 retains the hub 240 from moving axially on the shaft 236. The shaft is rotatably mounted by a bearing 244 located in the bearing cavity 222 and by the journal cavity 206.

A gear pump is located within the center of the housing 200. The gear pump includes a body plate 248 and two side plates 250 and 252. A central gear wheel or sun gear 254 is fixed to the shaft 236. Two or more diametrically opposed gear to wheels 256 (one of which is shown) are engaged with the central gear wheel 254. Trunions 258 located on the gear wheels 256 extend into journal holes 260 in the side plates 250 and 252. The gear wheels 256 are engaged with the central gear wheel 254.

A fluid circuit is arranged within the housing 200 extending between the reservoirs 212 and 224 and through the gear pump. Passages 262 and 264 in the side plates 250 and 252, respectively, are positioned at the pinch areas of each gear pair. One of the sets of passages 262 and 264 is located to one side of the pinch area while the other set of passages 262 and 264 is located to the other side of the pinch area. A control passage 266 extends through the body of the gear pump 246 to each of the reservoirs 212 and 224. A valve element 268 is positioned into the control passage 266. The element 268 is biased into the passage 266 by a spring 270. A threaded plug 272 is positioned behind the spring 270 and may be threaded inwardly or outwardly to adjust the compression on the spring 270. The element 268 is positioned such that pressure from either side of the control passage 266 will lift the element 268 away from that pressure beyond a threshold amount determined by the spring 270. Once lifted away from closure within the control passage 266, flow of incompressible fluid through the control passage 266 is initiated.

Each of the reservoirs 212 and 224 is of limited variable volume. Each reservoir contains a resiliently biased annular piston 274. The pistons 274 are biased by springs 276. The pistons 274 are only able to move a certain distance before providing great resistance to further movement. Consequently, high pressures can be built up in either of the reservoirs 212 or 224 as may be required. In association with one of the reservoirs 212, one or more indicators 278 extend from the hub 220 of the housing closure 214. The fluid charged to the fluid circuit will determine the extension of the indicators 278. Thus, the proper charge can be achieved.

In operation, the two-way torque limiter of FIG. 11 is symmetrical for driving in either direction. Assuming a rotation such that the forward direction makes the reservoir 212 the low pressure inlet reservoir and the reservoir 224 the high pressure outlet reservoir, flow will be drawn into the gear pump 246 through the passage 262 from the reservoir 212. The gear pump 246 will pump the incompressible fluid until the reservoir 224 is expanded to its maximum extent. As the valve element 268 is closed, a maximum pressure will be reached and the pump will effectively stall. As shock loadings or excessive torque are experienced by the drive train, the threshold pressure in the portion of the control passage 262 connecting the reservoir 224 with the valve element 268 will increase beyond the threshold defined by the compression within the spring 270. At this time, the valve element 268 will open and allow flow back to the reservoir 212 through the other side of the control passage 266. At this time, the pump will no longer be stalled and the housing 200 and shaft 236 are able to rotate relative to one another. Once the torque level drops, the valve element 268 closes. The gear pump 246 again stalls and the housing 200 rotates with the shaft 236. When excessive torque is experienced in the opposite direction, the system will work in reverse, again lifting the valve element 268.

Figure 12:
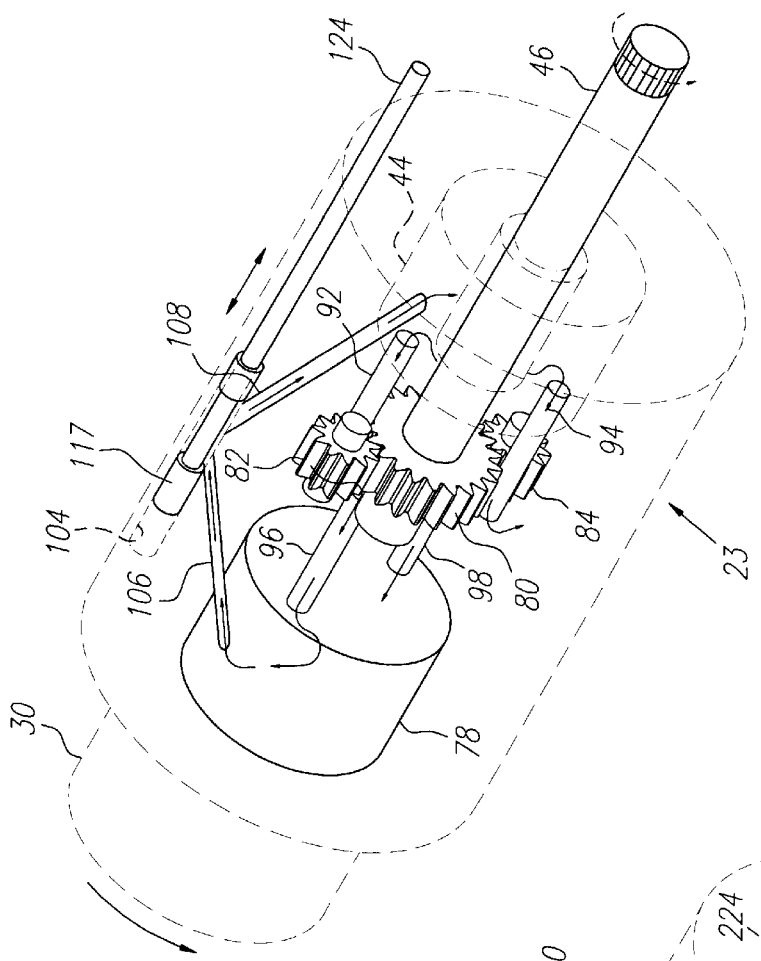
FIG. 12 is a schematic prospective view of a variable rate clutch.

Turning next to the variable rate clutch as it is represented schematically in FIG. 12, a device like that of FIGS. 1 through 10 is contemplated. Consequently, an understanding of the schematic nature of the following drawings can be acquired through a comparison of FIG. 12 with the detailed structure of FIGS. 1 through 10. Like reference numerals reflect similar elements.

Figure 13:
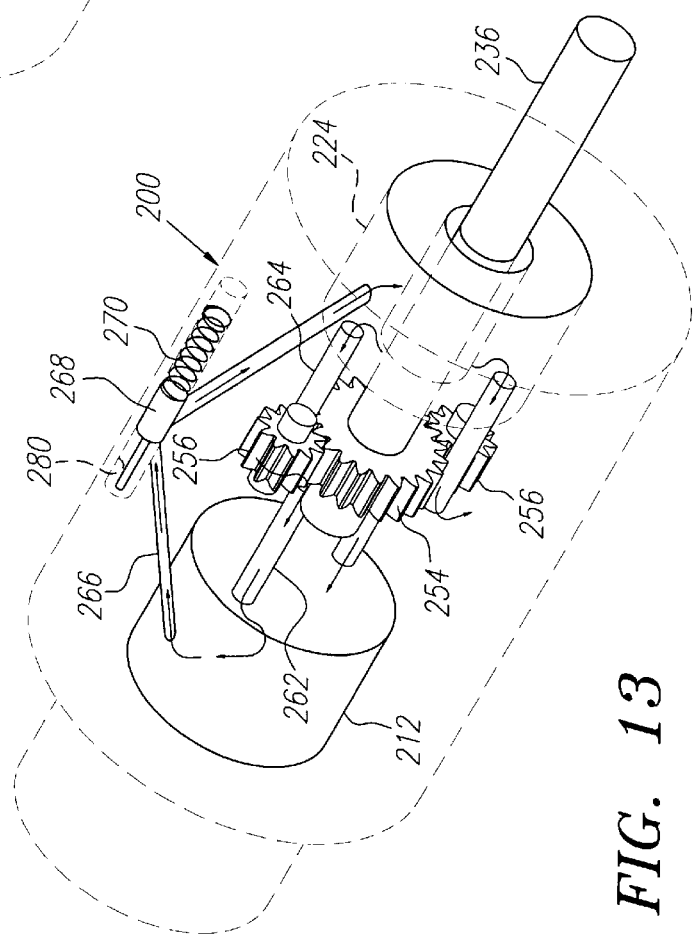
FIG. 13 is a schematic prospective view of an adjustable torque limiter.

FIG. 13 schematically illustrates an adjustable torque limiter. This schematic illustration reflects much the same structure as the device illustrated in FIG. 11. Similar reference numerals are applied. One change illustrated is that the spring 270 is axially arranged with the valve element 268 slidably retained within a cavity 280 extending parallel to the axis of the adjustable torque limiter.

FIG. 14 schematically illustrates a brake. The primary shaft 300 constitutes the axle of a wheel 302. The housing 304 is fixed to the suspension system which also rotatably mounts the axle 300. The gear pump 306 located within the housing 304 includes the sun gear 308 fixed to the axle 300 and the planet gear rotatably mounted to the housing 304. A forward sensor 312 and a reverse sensor 314 may use a field, a torque element or pressure to sense forward and reverse motion.

Two passages 316 and 318 extend to either side of the pinch area of the gear pump 306. With the axle rotating in one direction, one of the passages 316 and 318 operates as the inlet passage while the other one operates as the outlet passage. Naturally, with the axle running in the opposite direction, the passages 316 and 318 function in reverse.

The forward and reverse sensors 312 and 314 control a four-way valve 320 associated with the passages 316 and 318. The four-way valve has two positions so as to effectively reverse the coupling of the passages 316 and 318 with the remainder of the fluid circuit.

The remainder of the fluid circuit includes passages 322 and 324 extending from the four-way valve 320 through a slide plate valve 326. The remainder of the circuit completes a loop through an oil cooler 328 and a pressure accumulator 330.

Assuming the passage 324 is aligned with the passage 318 with the wheel 302 rotating counterclockwise as seen from the side illustrated in FIG. 14, the slide plate valve 326 is illustrated in a position where there is no braking, i.e., the gear pump 306 is being starved of fluid because the passage 324 is closed. At the same time, the passage 322 is open and communicates with the passage 316. Thus, flow is free to move out of the gear pump 306. It can be noted that the slide plate valve 326 has profile ports to achieve a desired braking response. As the valve 326 is moved to the right as best seen in FIG. 14, the inlet at the time, passage 324, begins to open. The outlet, passage 322 begins to close. In this way, fluid will build up in the gear pump 306 to create a back pressure in the pump. Once the valve 326 is moved completely, the back pressure stops the gear pump 306 and in turn the wheel 302.

Looking next to FIG. 15, a differential is illustrated. The differential includes two gear pumps having a common housing 350. Each gear pump has a sun gear 352 and two planet gears 354. Each of the sun gears 352 is attached to an output shaft 356. The housing 350 is rotatably mounted and is driven to rotate by a power source.

The completed circuit is not illustrated in FIG. 15. However, a pressure accumulator and possibly an oil cooler would be coupled in series through the passage 358 and the valve port 360. A slide valve 362 creates a three-way valve having a rest position with the valve port 360 in communication with neither of the gear pumps. The three-way valve is able to slide one way or the other to release pressure from one of the output passages 364 and 366. In doing so, the relieved passage allows the associated gear pump to slip to create a differential response.

Figure 16:
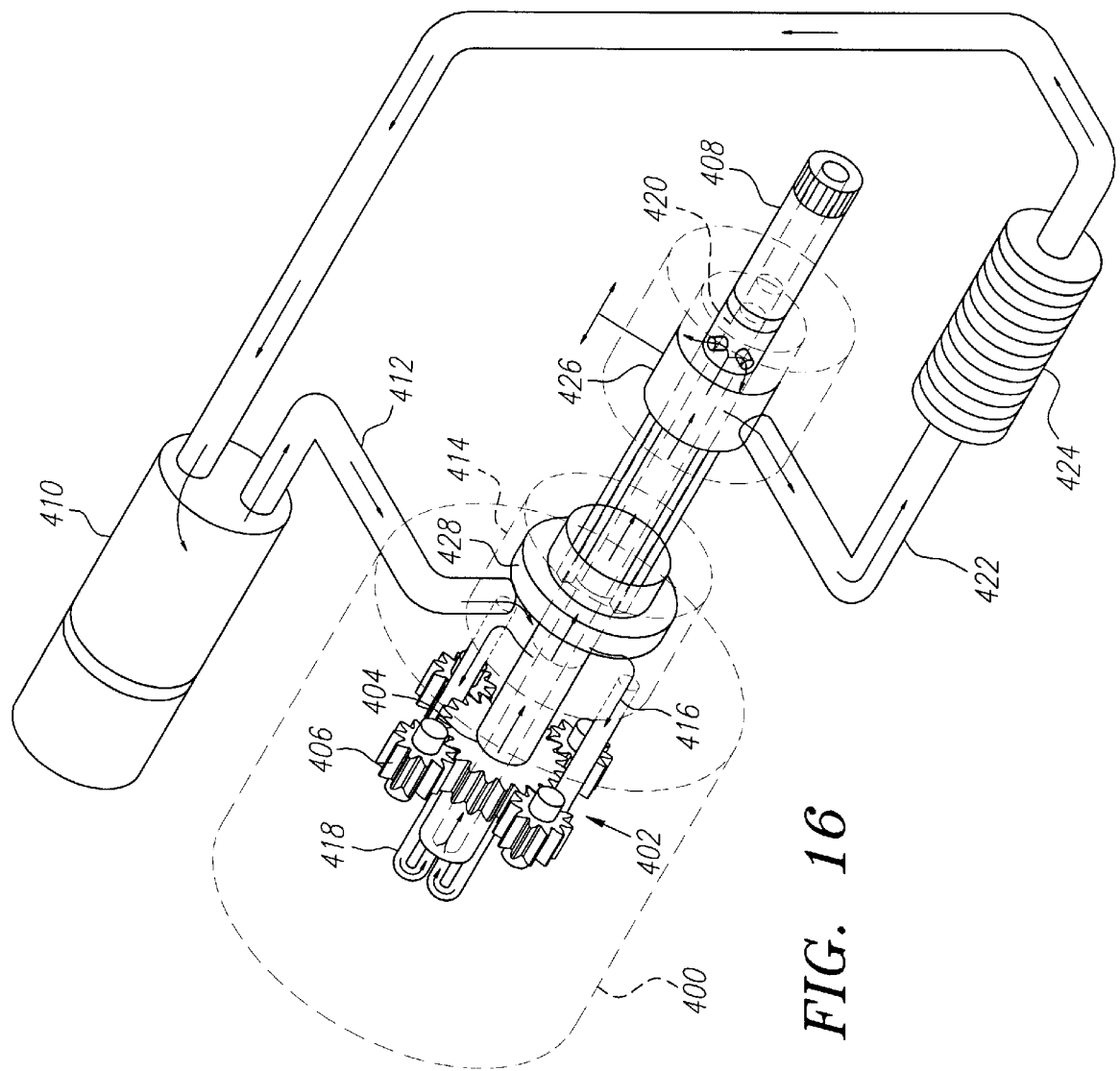
FIG. 16 is a schematic prospective view of a variable rate clutch.

FIG. 16 illustrates a variable rate clutch. This device employs the shaft as a return or outlet passage. The housing 400 is mounted to the drive of a vehicle or the like. A gear pump, generally designated 402 includes a sun gear 404 and four planetary gears 406. The planetary gears 406 are rotatably mounted relative to the housing 400; and the sun gear 404 is mounted to a driven shaft 408. The driven shaft 408 is rotatably mounted relative to the housing to provide output power.

Input fluid from a pressure accumulator 410 is provided through an input passage 412 to an input reservoir 414. Short intake passages 416 extend to adjacent the input pinch area at each of the four planetary gears 406. Output from the gear pump 402 proceeds by means of output passages 418 which extend to the end of the shaft 408. The shaft 408 is hollow to allow flow downwardly to radial outlet ports 420. The outlet ports 420 are arranged such that certain of them are displaced longitudinally from one another. An outlet passage 422 passes through an oil cooler 424 and back to the pressure accumulator 410.

To control the variable rate clutch, an actuator assembly includes a slide valve 426 around the shaft 408 and over the radial outlet ports 420. Movement of this slide valve 426 selectively covers and uncovers the ports 420 to relieve pressure on the output from the gear pump and allow slippage. The actuator assembly further includes a valve plate 428 which moves with the slide valve 426 and which extends to cover the intake passages 416 to starve the gear pump 402 at the same time that the radial outlet ports 420 are being uncovered by the slide valve 426. Conversely, when the valve plate 428 begins to uncover the intake passages 416, the slide valve 426 is operating to cover the radial outlet ports 420.

Figure 17:
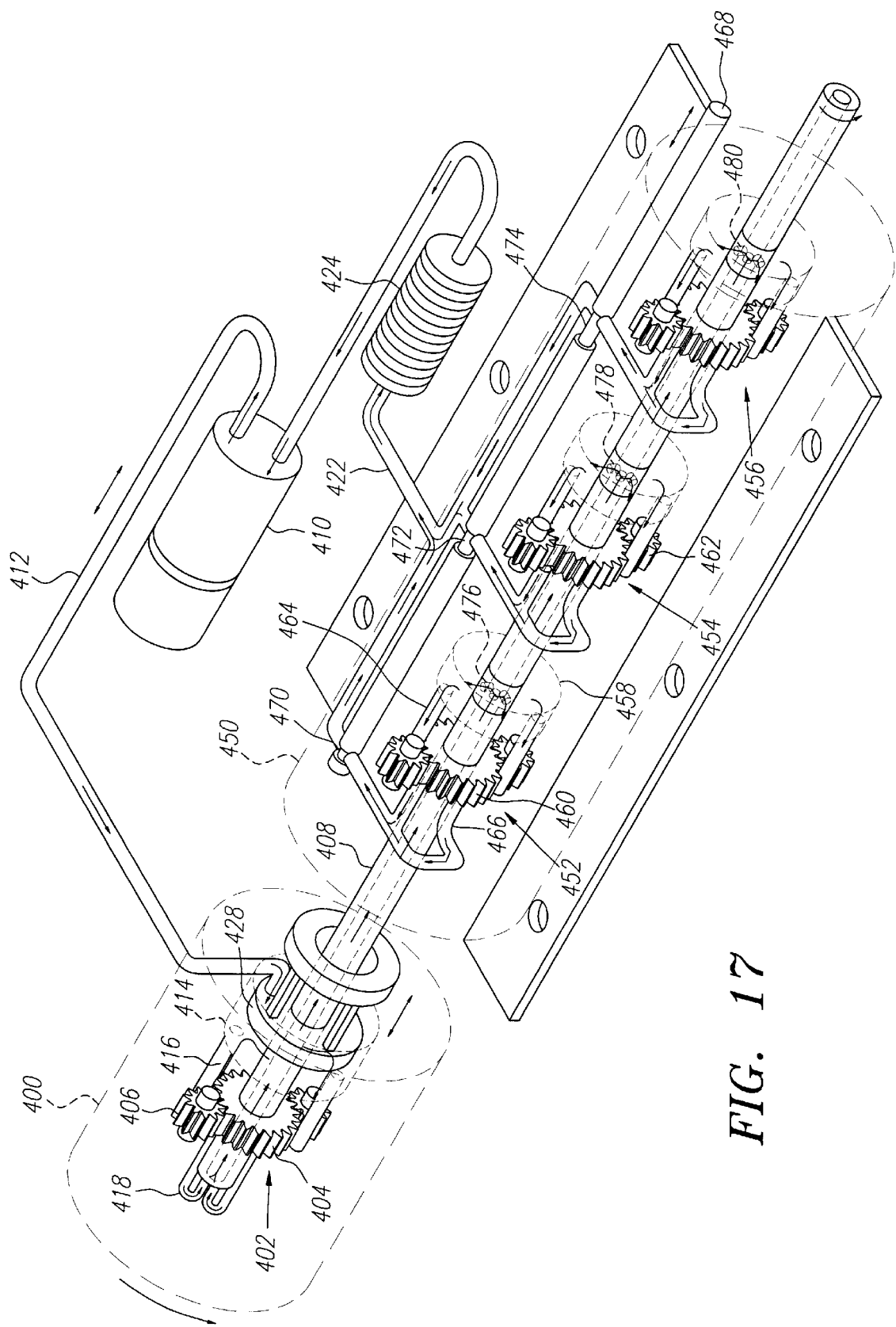
FIG. 17 is a schematic prospective view of a continuously variable transmission.
Figure 18:
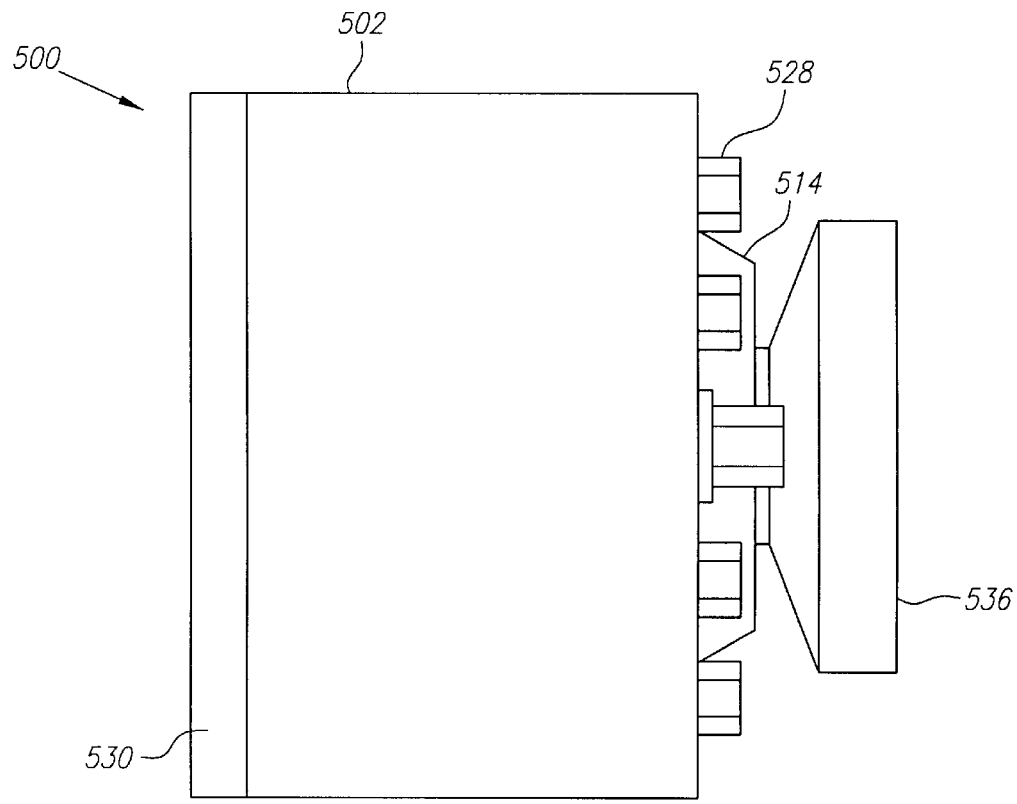
FIG. 18 is a side view of a two-way clutch.
Figure 19:
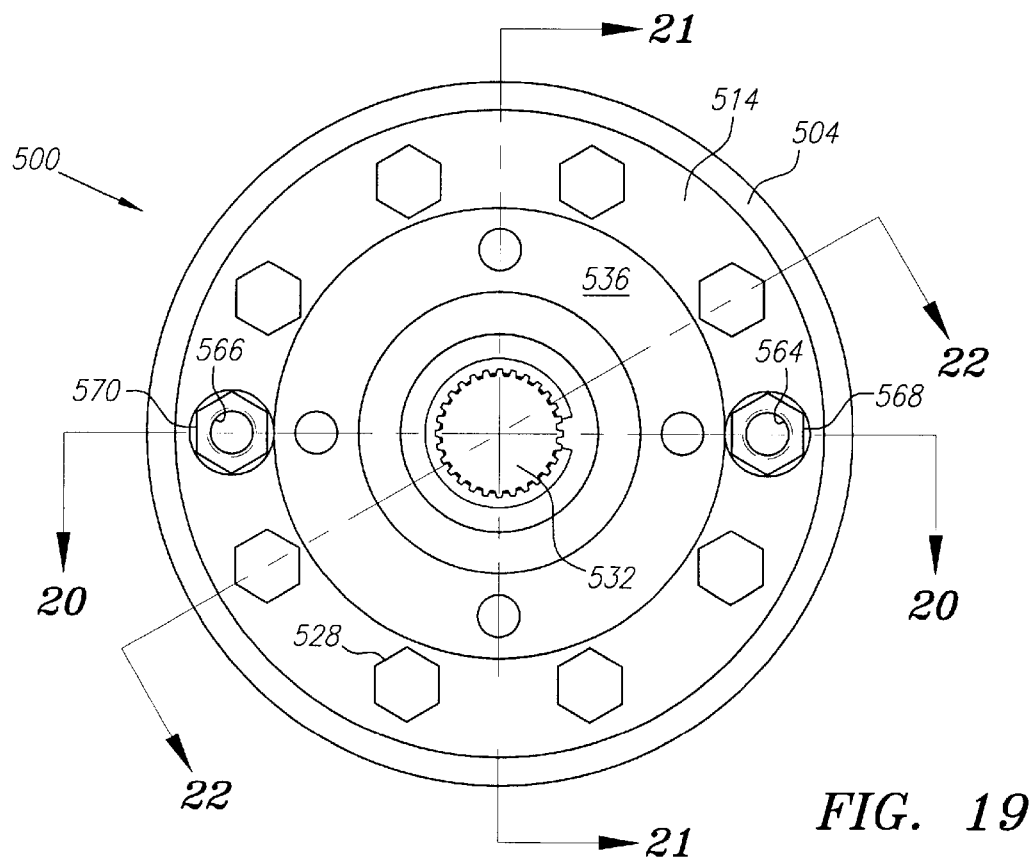
FIG. 19 is the driven end view of the clutch of FIG. 18.

FIG. 17 employs what might be thought of as a highly-complicated outlet valve to create torque multiplication. The input portion and gear pump are much like that of the clutch of FIG. 16 and like numbers are employed to represent elements having like function.

The complicated output valve arrangement includes a housing 450 and multiple gear pumps, generally designated 452, 454 and 456. Each of these gear pumps 452, 454 and 456 include substantially identical components including input reservoirs 458, sun gears 460, planetary gears 462, inlet passages 464 and outlet passages 466. The outlet passages 466 all extend to a valve shaft 468. The valve shaft 468 includes three annular passages 470, 472 and 474. The annular passages are each of different lengths and progressively open or close with longitudinal movement of the valve shaft 468. Each of the annular passages 470, 472 and 474 communicates with the outlet passage 422. The outlet passage from the gear pump 402 is axially through the shaft 408. Radial outlet ports 476, 478 and 480 feed the gear pumps 452, 454 and 456. Finally, each of the sun gears 460 employs a Sprag clutch allowing one-way rotation relative to the shaft and rigid coupling against rotation in the opposite direction.

In operation, the valve shaft 468 may be considered pulled to a location that all of the annular passages 470, 472 and 474 are open. This condition is illustrated in FIG. 17. At the same time, the valve plate 428 is closed over the intake passages 416. In this way, the gear pump 402 is starved for fluid and there is no back pressure through the outlet passages. The valve plate 428 on the inlet side of the gear pump 402 is opened. Consequently, flow begins to progress through the shaft 408 and drives all three gear pumps 452, 454 and 456. This provides a first, lower speed range of the shaft 408.

The valve shaft 468 is then drawn longitudinally to close the passage 470. With this closure, the gear pump 452 is substantially locked. Because of the Sprag clutch associated with the sun gear 460, the shaft 408 is unimpeded in rotation. However, inlet flow to the gear pump 452 is terminated and each of the successive gear pumps 454 and 456 experiences increased flow from one-third of the total to one-half of the total flow from the gear pump 402. Consequently, the gear pumps 454 and 456 are driven faster. At the same time, back pressure to the gear pump 402 increases. Consequently, a new speed range is achieved for the output shaft 408. The process may be repeated with closure of the output from the gear pump 454. A further speed range 408 is achieved for the output shaft. Finally, with the closure of the annular passage 474, the gear pump 456 is stalled and flow no longer exits from the gear pump 402. At this time, the housing 400 and the shaft 408 have achieved direct drive. Naturally, to drop relative speed of the shaft 408, one or more of the gear pumps 452, 454 and 456 would be opened to allow communication through the annular passages associated with the valve shaft 468.

Another embodiment is illustrated in FIGS. 18 through 22. This device is either a variable rate clutch or an adjustable torque limiter depending on the drive or spring action, respectively, on the control shafts. A housing, generally designated 500 includes a body 502 with a cylindrical side wall 504. A journal cavity 506 is defined by an inner circular sleeve 508 in the body 502. An outer circular step 510 cooperates with the inner circular sleeve 208 to define an annular reservoir 512.

A housing closure 514 includes an outer annular rim 516 and a circular inner sleeve 518. A hub 520 extends from the inner circular sleeve 518 to the outer annular rim 516. A bearing cavity 522 is defined within the hub 520. The outer annular rim 516 and the inner circular sleeve 518 define an annular reservoir 524. The hub includes a central bore 526. Fasteners 528 retain the body 502 and the housing closure 514 together. A mounting plate 530 is positioned on one end of the housing 500.

A shaft 532 is rotatably mounted within the journal cavity 506 and within the central bore 526. A bearing 534 within bearing cavity 522 rotatably supports the shaft 532 adjacent to a mounting hub 536. The mounting hub 536 is associated with a shaft 532 through splines 538 and retained from sliding axially by a spring clip 540. A sun gear 542 is provided on the shaft 532.

Figure 21:
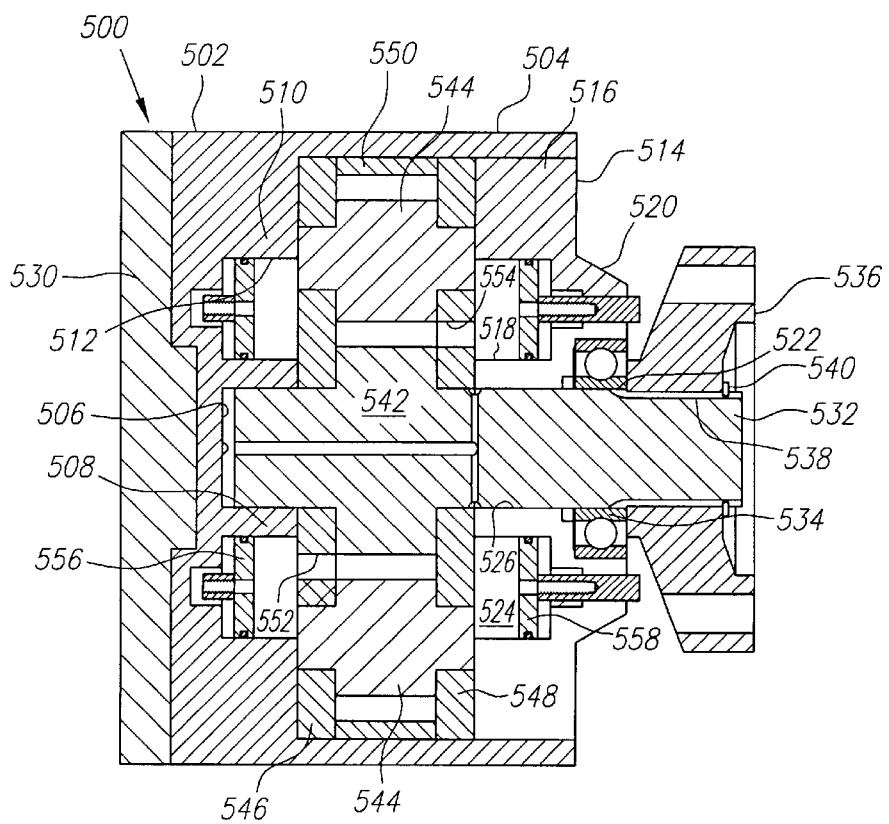
FIG. 21 is a cross-sectional side view taken along line 21-27 of FIG. 19.
Figure 22:
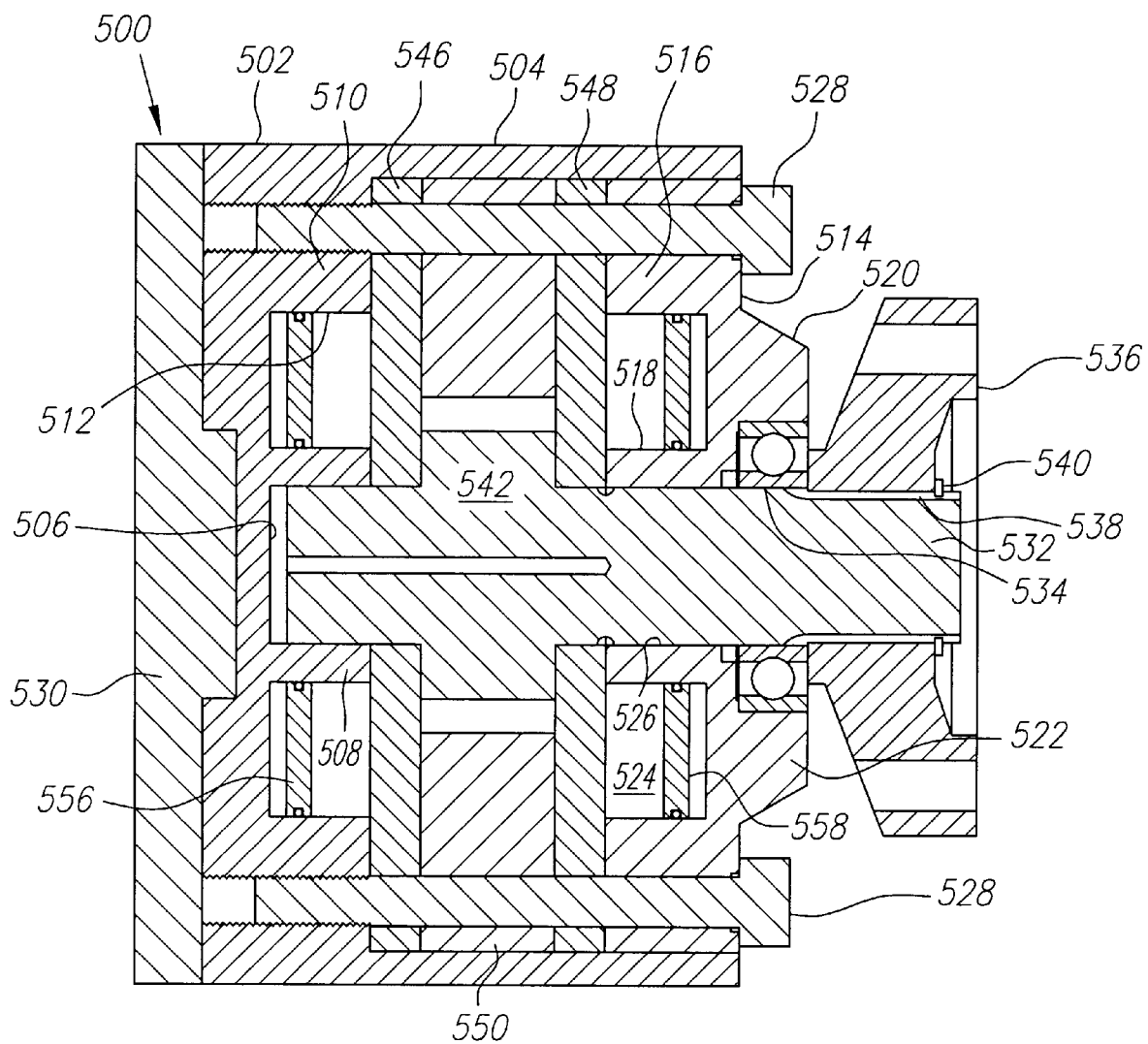
FIG. 22 is a cross-sectional side view taken along line 22—22 of FIG. 19.

The sun gear 542 provides a part of the gear pump through engagement with planetary gears 544 as seen in FIG. 21. The gear set is sandwiched between side plates 546 and 548 with a surrounding body plate 550. Passages 552 extend from the pinch area adjacent both planetary gears 544 to the annular reservoir 512. Similarly, passages 554 extend through the side plate 548 to the annular reservoir 524 from the other side of the pinch areas associated with the planetary gears 544. Annular pistons 556 and 558 provide a limited variable volume and a fixed low pressure level when the associated reservoir is acting as the input reservoir.

Figure 20:
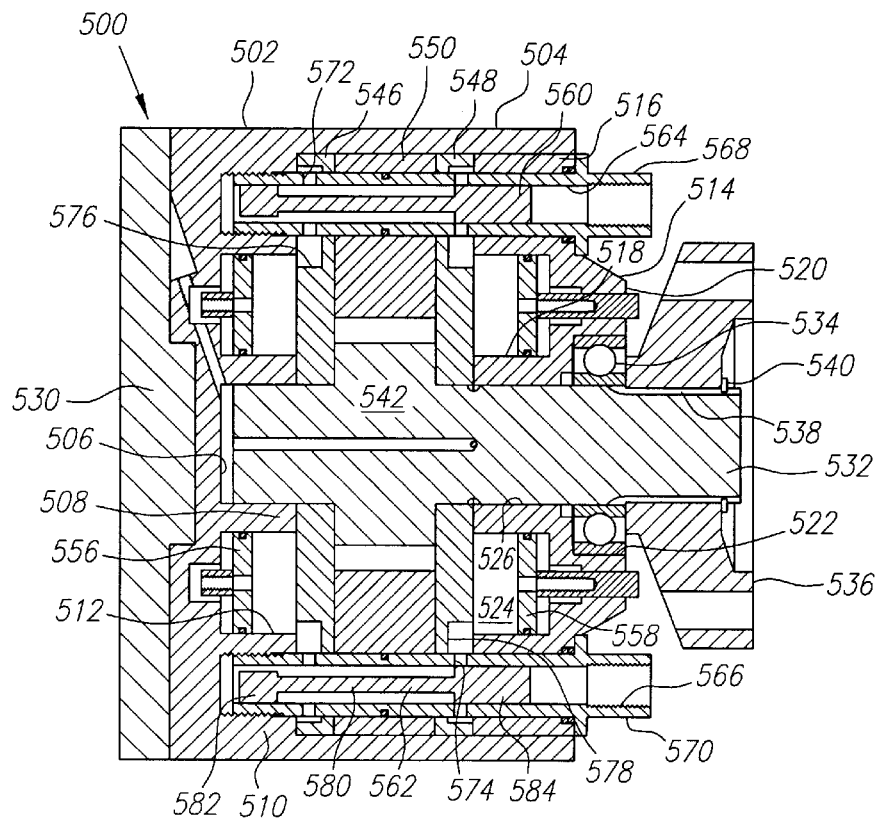
FIG. 20 is a cross-sectional side view along line 20—20 of FIG. 19.

Control is provided by two valve elements 560 and 562 illustrated in FIG. 20. The valve elements 560 and 562 are retained within bores 564 and 566 associated with threaded bushings 568 and 570, respectively. Ports 572 and 574 extend through the bushings 568 and 570, respectively, to communicate the bores 564 and 566 with annular passageways 576 and 578 defined in the side plates 546 and 548, respectively. The passageways 576 and 578 are in communication with the reservoirs 512 and 524, respectively.

The valve elements 560 and 562 each include a thin central element 580 with two heads 582 and 584 at either end. The heads 582 and 584 are spaced so that one or the other or neither is able to cover the ports 572 and 574. The thin section 580 allows axial flow to the bores 564 and 566 when both ports 572 and 574 are open.

The symmetry of the system provides for operation in either direction of rotation. The valve elements 560 and 562 operate the same through movement in opposite directions for opposite shaft rotations. Depending on the valve element placements and the rotational direction of the shaft 532, the intake to the gear pump is starved and adequate room is provided for the fluid to accumulate in the output side or the input side is fed and the output side is subjected to back pressure. These conditions define free wheeling and full engagement, respectively.

Figure 23:
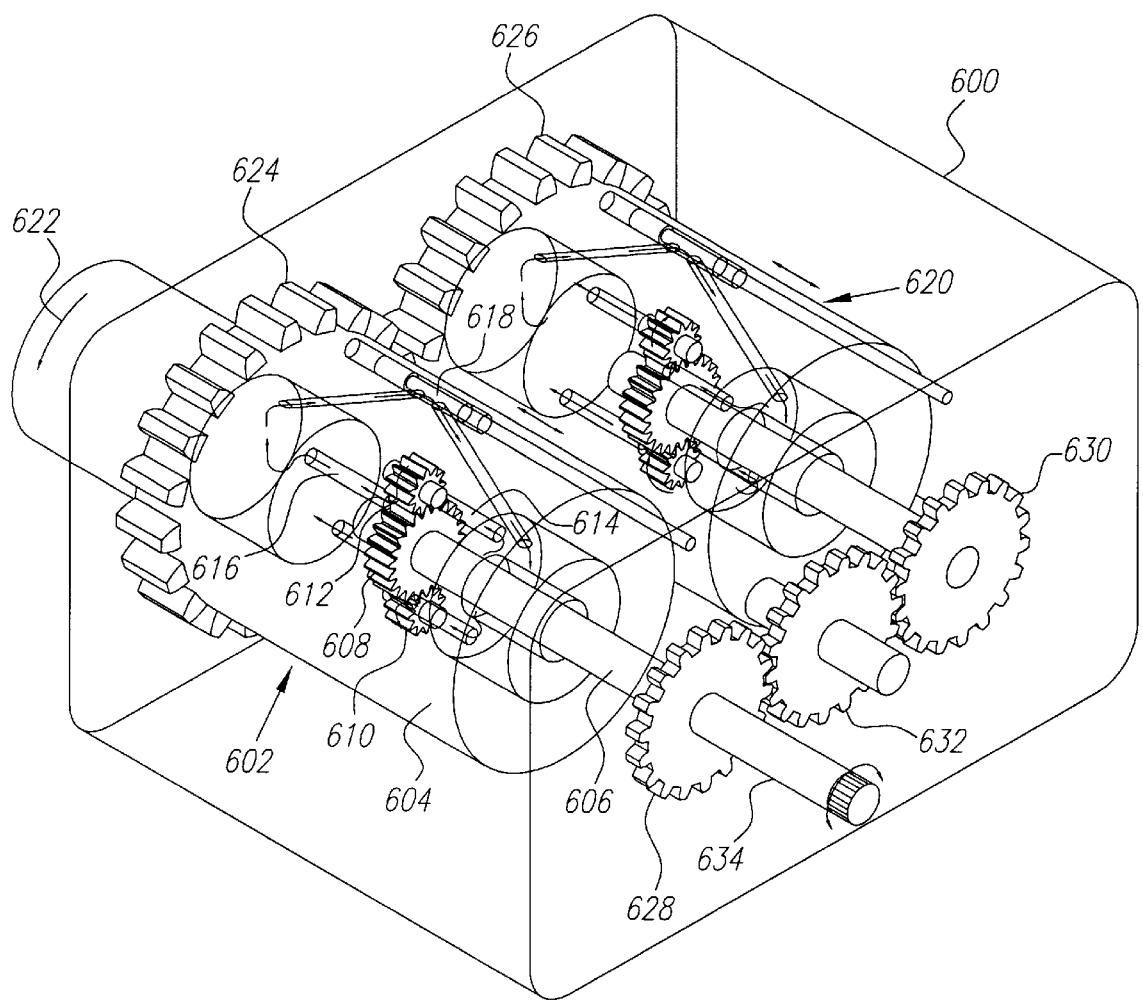
FIG. 23 is a schematic perspective view of a forward/reverse variable speed clutch.

In FIG. 23, a schematic view of a forward/reverse variable speed clutch is illustrated which is particularly contemplated for work vehicles experiencing frequent reversals of direction. Backlash is avoided with this arrangement.

A rotational output control system is illustrated that has a case 600. A direct clutch, generally designated 602 is rotatably mounted within the case 600. The direct clutch 602 includes a housing 604 and an output shaft 606. The output shaft 606 is rotatably mounted at the housing 604 and extends outwardly from one end thereof. A gear pump 608 is operatively positioned within the housing 604 and coupled between the housing 604 and the output shaft 606 as provided for in the prior embodiments. The pump 608 includes planetary gear wheels 610 rotatably mounted to the housing 604 and a sun gear 612 fixed to the output shaft 606.

A fluid circuit is associated with the direct clutch to include an inlet 614 and an outlet 616. A control valve assembly includes an output valve element 618 controlling the outlet 616. An input valve element as shown in the prior embodiments may also be employed. The output valve element controls engagement of the direct clutch 602 while the input valve element controls the ability to free wheel. Degrees of engagement may be achieved through intermediate positions of these elements.

A reverse clutch, generally designated 620 may be conveniently identical to the direct clutch 602. A repetitive recitation of the components of the reverse clutch 620 is believed superfluous and reference is simply made to the above disclosure of the direct clutch 602 with corresponding reference numbers applied. The reverse clutch 620 is also rotatably mounted within the case 600.

An input 622, most appropriately a power takeoff shaft, is coupled with the housing 604 of the direct clutch 602. A drive gear set is positioned about the housing 604 of the direct clutch 602 and the reverse clutch 620. This drive gear set includes a drive gear wheel 624 and a driven gear wheel 626. The gear wheels 624 and 626 are continuously engaged. Thus, power through the input 622 causes both the direct clutch 602 and the reverse clutch 620 to rotate.

A driven gear set is rotatably mounted relative to the case 600. A direct gear wheel 628 is associated with the output shaft 606 of the direct clutch 602. A reverse gear wheel 630 is fixed to rotate with the output shaft of the reverse clutch 620. An idler wheel 632 is located between the direct gear wheel 628 and the reverse gear wheel 630 and is in constant mesh with both. Finally, a drive shaft 634 is constrained to rotate with the direct gear wheel 628.

In operation, a forward/reverse variable speed clutch is defined by the foregoing rotational output control system. Control of the clutch is exercised through control of the fluid circuits to each of the gear pumps located within the two clutches 602 and 620. By locking the gear pump associated with the direct clutch 602, power proceeds directly from the input 622 through the clutch 602 to the drive shaft 634. At the same time, the input valve element in the reverse clutch 620 may be closed so that it is near free wheeling. Adjustments to the control valve of the direct clutch 602 provides the variability of partial disengagement.

To run in reverse, the reverse clutch 620 is locked and the direct clutch 602 is placed in the free wheeling mode. Power is then directed from the input 622 through the drive gear set to the reverse clutch 620. Power then passes through the driven gear set back to the direct gear wheel 628 and out the drive shaft 634. Through the various gears, rotation of the drive shaft 634 will be in reverse.

Because of the minimal drag developed by some fluid passing through the gear pump of the reverse clutch 620, minimal resistance to rotation of the direct gear wheel 628 is encountered during direct drive. When shifted to reverse drive, the driven gear set is already snug in the reverse drive direction. Consequently, backlash with harmful impact is avoided.

Figure 24:
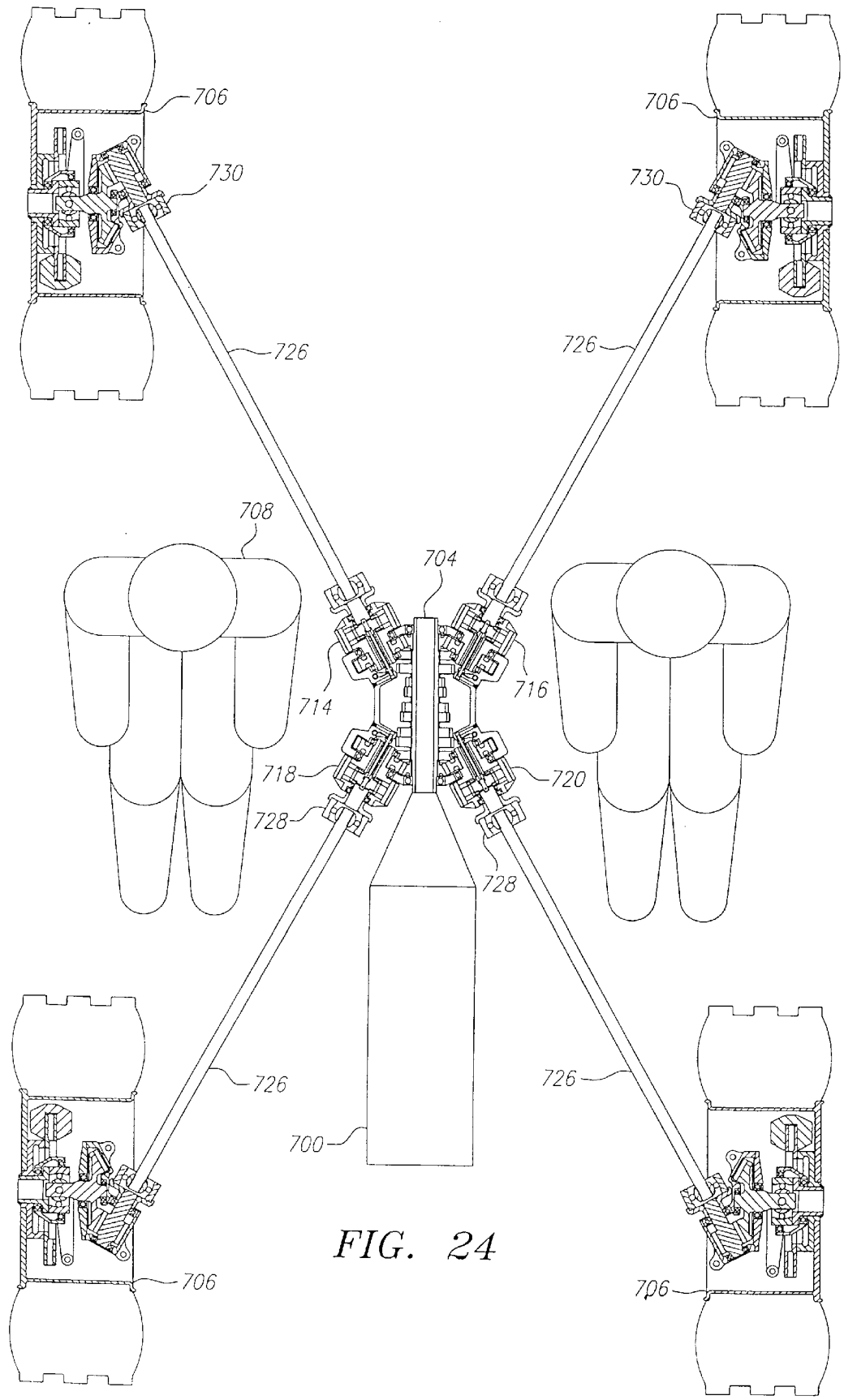
FIG. 24 is a plan view of a vehicle drive system.
Figure 25:
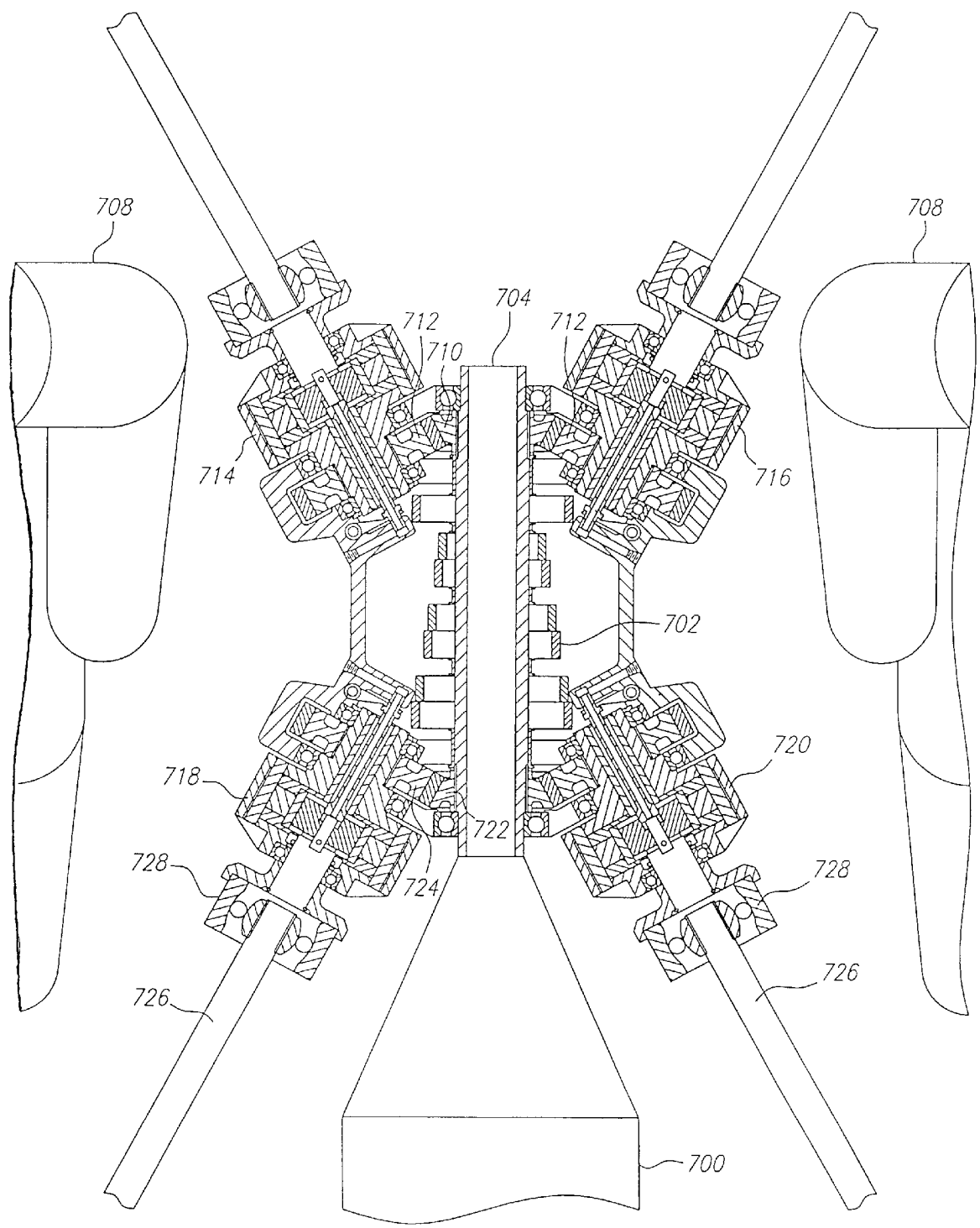
FIG. 25 is a detailed plan view of the center drive mechanism of the system of FIG. 24.
Figure 26:
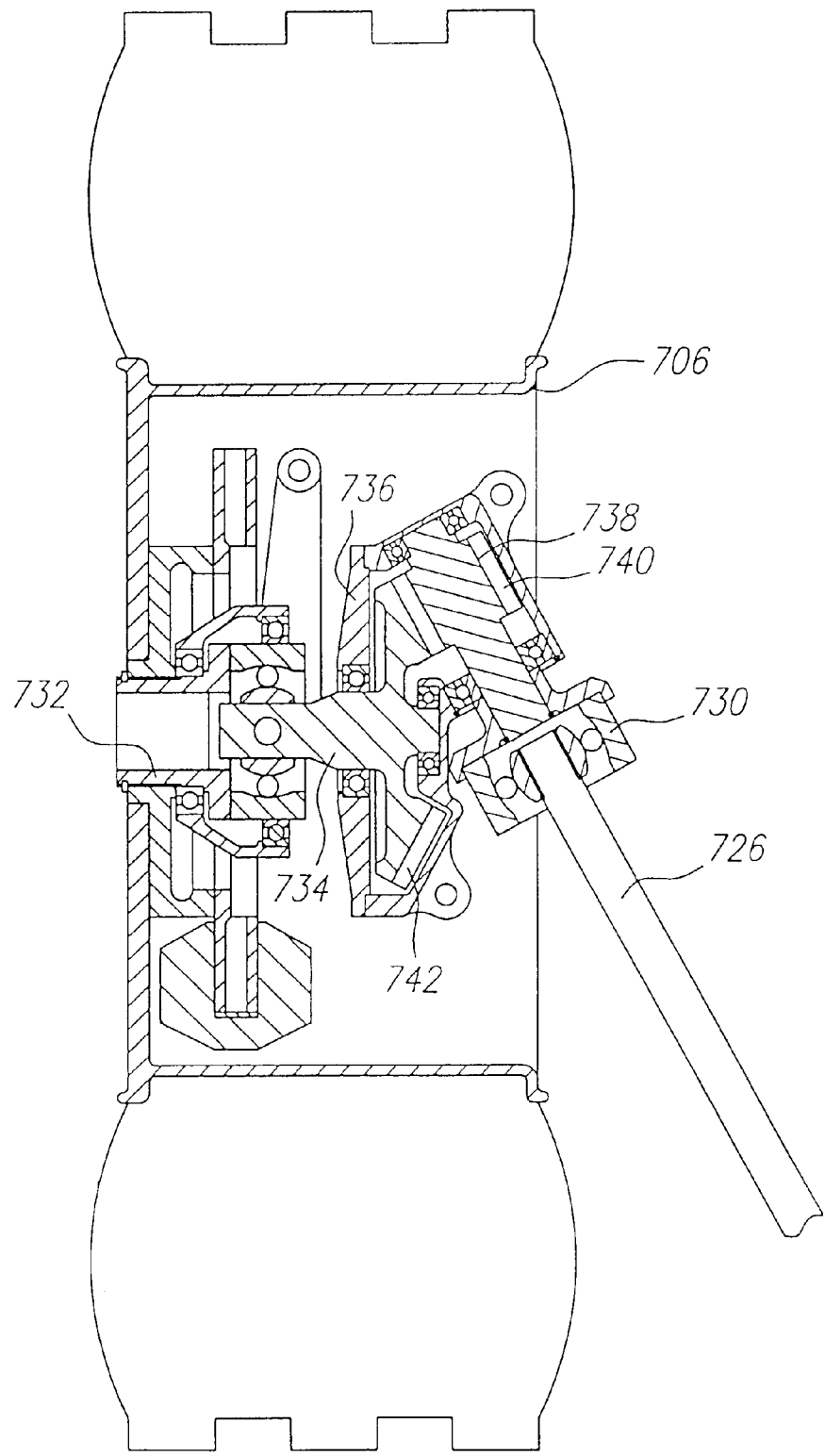
FIG. 26 is a detailed plan view of the wheel assembly section of the drive mechanism of the system of FIG. 24.

Turning to the embodiment of FIGS. 24 through 26, a four wheel drive vehicle is illustrated. A vehicle layout is illustrated in FIG. 24 having an engine 700, a transmission 702 with a rotatably mounted output shaft 704, four wheels 706 and passenger locations 708. The drive is presented in an X pattern as viewed from above.

Looking then to the details as provided in FIGS. 25 and 26, a first gear set includes a drive gear wheel 710 which is splined to rotate with the output shaft 704. This gear wheel 710 is illustrated to be a Cylkro® gear made by Crown Gear B. V. in Enschede, Holland. This type of gear wheel 710 may be paired with a spur gear wheel. Alternatively, a bevel gear set may be employed. There are two such driven gear wheels 712 associated with the drive gear wheel 710. The two driven gear wheels 712 are associated with two rotatably mounted clutches 714 and 716 which are arranged with axes nonparallel with the output shaft 704. At the other end of the output shaft 704, two additional rotatably mounted clutches 718 and 720 are arranged with a second drive gear wheel 722. The clutches 718 and 720 similarly include driven gear wheels 724 engaged with the gear wheel 722. The configuration as shown, illustrates that the clutches 714, 716, 718 and 720 are directed to each of the four wheels of the vehicle. Through rotation of the output shaft 704 under power from the engine 700, controlled rotational power may be directed through each of the clutches as may be desired.

The clutches illustrated and contemplated in the preferred embodiment may be taken from those illustrated in the prior embodiments. Electronic control of the valve elements associated with each clutch may ultimately provide optimum drive characteristics. However, even with no active control with all wheels engaged, closure of the output valve elements results in all clutch engagement. At the same time, individual drives can be overrun as fluid in the gear pump can flow in reverse where it may be received by an input reservoir. To provide some resistance to overrunning, pressurized input fluid to the clutches can resist reverse operation of the gear pumps. Mechanical systems based on torque or other controls are also contemplated.

Each clutch 714, 716, 718 and 720 is associated with an axle half-shaft 726. These half-shafts 726 are directed to the wheel assemblies such as illustrated in FIG. 26. Constant velocity joints 728 and 730 are located at either end of each of the axle half-shafts 726. Each wheel includes a wheel hub 732 which is rotatably mounted through an axle shaft 734. The axle shaft 734 is in turn mounted to the independent suspension 736. A driving shaft 738 again includes either a spur or bevel gear 740 engaged with Cylkro® or bevel gear 742.

Figure 27:
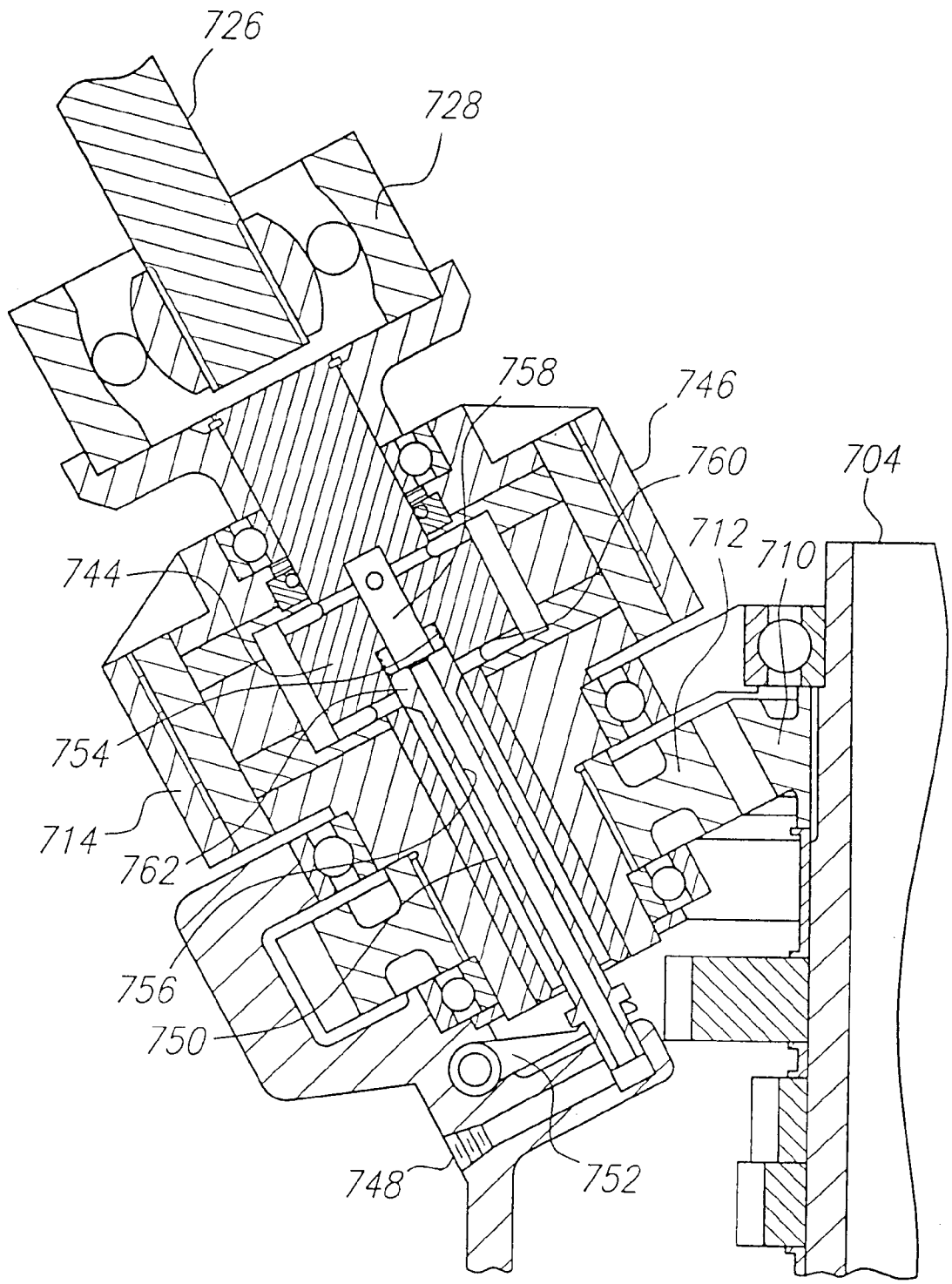
FIG. 27 is a detail cross-sectional plan view of a clutch of the system of FIG. 24 illustrated schematically to show flow paths through the gear pump.

The clutches 714, 716, 718 and 720 are represented in FIG. 27 by clutch 714. The clutch 714 includes a gear pump 744 within a housing 746. An inlet 748 to the housing is coupled with pressurized oil from the transmission 700. A control plunger 750 slides within the assembly and is controlled by a plunger activation arm 752 and a return spring 754. The control plunger 750 has a central passage 756 in communication with the inlet 748. The other end of the central passage 756 is in communication with an inlet 758 of the gear pump 744.

On the other side of the gear pump 744, an outlet 760 returns to the periphery of the control plunger 750. An outlet valve element 762 on the end of the control plunger 750 controls output flow from the gear pump 744 based on positioning of the control plunger 750. When the plunger 750 is depressed against the return spring 754, flow is permitted and the clutch 714 is disengaged.

The foregoing drive train provides for easy control with a minimum amount of equipment. Further, the half-shafts 726 are extremely long for the size of the vehicle. This allows for very substantial suspension travel which can greatly enhance the all terrain character of the vehicle. Further, ground clearance may be very high at the center of the vehicle.

Thus, a series of mechanisms are defined for controlling rotational output. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A rotational output control system comprising a housing;

a shaft rotatably mounted relative to the housing;

a gear pump in the housing including a first gear wheel rotatably mounted relative to the housing, a second gear wheel engaged with the first gear wheel and rotatable with the shaft;

a fluid circuit including an inlet to the gear pump, an outlet from the gear pump, a valve having a first valve element in the gear pump outlet to selectively control flow from the gear pump, a reservoir having a variable volume, the inlet being from the reservoir to the gear pump and the outlet being from the gear pump to the reservoir.

2. The rotational output control system of claim 1, the valve further having a second valve element selectively controlling flow to the gear pump.

3. A rotational output control system comprising a housing:

a shaft rotatably mounted relative to the housing;

a gear pump in the housing including a first gear wheel rotatably mounted relative to the housing, a second gear wheel engaged with the first gear wheel and rotatable with the shaft;

a fluid circuit including an inlet to the gear pump, an outlet from the gear pump, and a valve having a first valve element in the gear pump outlet to selectively control flow from the gear pump, the valve further having a second valve element selectively controlling flow to the gear pump, the fluid circuit further including a reservoir having a variable volume, the inlet being from the reservoir to the gear pump and the outlet being from the gear pump to the reservoir.

4. The rotational output control system of claim 1, the reservoir having a resiliently biased piston at one end thereof.

5. The rotational output control system of claim 4, the fluid circuit being completely filled with incompressible fluid.

6. The rotational output control system of claim 1, the fluid circuit having a fixed volume of fluid, the fluid being incompressible.

7. The rotational output control system of claim 1, the housing including a body with a cavity having an opening at one end, a cap across the opening and fixed to the body, the gear pump being in the cavity, the shaft extending through the housing into the cavity to the gear pump.

8. The rotational output control system of claim 7, the cap including a bearing receiving the shaft extending therethrough.

9. The rotational output control system of claim 1 further comprising a valve actuator including a slide axially slidable on the housing, a bearing on the slide, a ring rotatably mounted to the slide by the bearing, the first valve element being attached to the slide.

10. A rotational output control system comprising a housing;

a shaft rotatable mounted relative to the housing;

a gear pump in the housing including a first gear wheel rotatably mounted relative to the housing, a second gear wheel engaged with the first gear wheel and rotatable with the shaft;

a fluid circuit including an inlet to the gear pump, an outlet from the gear pump, and a valve having a first valve element in the gear pump outlet to selectively control flow from the gear pump;

a valve actuator including a slide axially slidable on the housing, a bearing on the slide, a ring rotatably mounted to the slide by the bearing, the first valve element being attached to the slide, the valve actuator further including a gimbal ring, pivotal attachments between the gimbal ring and the ring and two drivers each attached to the gimbal ring at mutually diametric positions and equidistant from the pivotal attachments of the gimbal ring to the ring.

11. The rotational output control system of claim 1, the gear pump further including a third gear wheel rotatably mounted to the housing and engaged with the second gear wheel.

12. The rotational output control system of claim 11, the first and third gear wheels being diametrically positioned across the second gear wheel.

13. The rotational output control system of claim 12, the inlet having two inlet passages to the gear pump and the outlet having a manifold and two outlet passages between the gear pump and the manifold.

14. The rotational output control system of claim 1 further comprising a rotatable drive, the housing being rotatable with the rotatable drive.

15. The rotational output control system of claim 14, the housing being a rotational input shaft and the shaft being a driven output shaft.

16. The rotational output control system of claim 15, the valve further having a second valve element selectively controlling flow to the gear pump, the clutch being disengaged from the driven output shaft with the inlet closed by the second valve element and the outlet open, the clutch being fully engaged with the driven output shaft with the inlet open and the outlet closed by the first valve element.

17. The rotational output control system of claim 16, the gear pump further including a third gear wheel rotatably mounted to the housing and engaged with the second gear wheel.

18. The rotational output control system of claim 16, the first valve element and the second valve element being movable together, the valve having a first extreme position with the outlet closed by the first valve element and a second extreme position with the inlet closed by the second valve element.

19. The rotational output control system of claim 18, the valve including intermediate positions with the outlet partially closed and with the inlet partially closed.

20. The rotational output control system of claim 1, the first valve element being resiliently biased toward a closed position in the outlet, the first valve element moving to open in a direction away from pump pressure in the outlet above a threshold pressure.

21. The rotational output control system of claim 20, the gear pump further including a third gear wheel rotatably mounted to the housing and engaged with the second gear wheel.

22. The rotational output control system of claim 20 further comprising a rotatable drive, the housing being rotatable with the rotatable drive.

23. The rotational output control system of claim 22, the housing being a torque limiter and the shaft being a driven output shaft.

24. The rotational output control system of claim 2 further comprising an axle;

a vehicle suspension element to which the axle is rotatably mounted, the housing being fixed to the vehicle suspension element and the shaft being an extension of the axle.

25. The rotational output control system of claim 24 further comprising a sensor to determine direction of gear pump rotation, the fluid circuit further including a reverse valve controlled by the sensor and coupling the inlet selectively to one of the first valve element and the second valve element and coupling selectively in opposition the outlet to the other of the first valve element and the second valve element.

26. The rotational output control system of claim 1 further comprising a second said housing fixed to the housing;

a second said shaft, the shaft and the second said shaft extending in opposite directions from the attached housing and second said housing, respectively;

a second said gear pump;

a second said fluid circuit, the valve of the fluid circuit and the valve of the second said fluid circuit being common, the valve being a three-way valve with the valve element selectively blocking flow, allowing flow from the outlet of the gear pump and allowing flow from the outlet of the second said gear pump.

27. The rotational output control system of claim 26, the fluid circuit and the second fluid circuit further including a common reservoir constantly in communication with the gear pump and the second gear pump, respectively, through the inlet and the second inlet, respectively.

28. The rotational output control system of claim 27, the housing and the second said housing being a differential and the shaft and the second said shaft being axles.

29. The rotational output control system of claim 1, the shaft having a longitudinal passage open to the outlet and ports extending from the longitudinal passage to the surface of the shaft, the first valve element being slidably positioned on the shaft to selectively cover the ports.

30. The rotational output control system of claim 29, the ports being arranged longitudinally on the shaft to be selectively covered by the first valve element in seriatim.

31. The rotational output control system of claim 30, the valve further having a second valve element selectively controlling the inlet from the gear pump.

32. The rotational output control system of claim 30 further comprising a rotatable drive, the housing being rotatable with the rotatable drive.

33. The rotational output control system of claim 32, the housing being a clutch and the shaft being a driven output shaft.

34. The rotational output control system of claim 1, the fluid circuit further including the outlet including an outlet reservoir between the gear pump and the reservoir, the reservoir and the outlet reservoir being of limited variable volume, the first valve element being between the outlet reservoir arid the reservoir and resiliently biased toward a closed position, the first valve element moving to open under pump pressure in either of the outlet and the reservoir above a threshold pressure, the gear pump being in constant communication with the reservoir through the inlet.

35. The rotational output control system of claim 34, housing being a two-way torque limiter.

36. The rotational output control system of claim 35 further comprising a first axle, the housing being fixed to the first axle;

a second axle, the shaft being an extension of the second axle.

37. The rotational output control system of claim 1, the valve further having a second gear pump having a third gear wheel rotatably mounted to the shaft, a one-way clutch between the third gear wheel and the shaft, a fourth gear wheel rotatably mounted to the housing and engaged with the third gear wheel, a second gear pump inlet to the second gear pump and a second gear pump outlet from the second gear pump, a third gear pump having a fifth gear wheel rotatably mounted to the shaft, a second one-way clutch between the fifth gear wheel arid the shaft, a sixth gear wheel rotatably mounted to the housing and engaged with the fifth gear wheel, a third gear pump inlet to the third gear pump and a third gear pump outlet from the third gear pump, the pump inlet being in communication with the reservoir, the pump outlet being in communication with the second gear pump inlet and the third gear pump inlet, the second gear pump outlet and the third gear pump outlet being in communication with the reservoir, the first valve element being in the second gear pump outlet to selectively control flow therethrough.

38. The rotational output control system of claim 37, the valve further having a second valve element in the third gear pump outlet to selectively control flow therethrough.

39. The rotational output control system of claim 38, the first and second valve elements being coupled together and constructed and arranged to control the second gear pump outlet and the third gear pump outlet in seriatim.

40. A rotational output control system comprising a pump including a pump housing, a pump shaft, a pump inlet and a pump outlet;

a housing;

a shaft rotatably mounted relative to the housing;

a first gear pump having a first gear wheel rotatably mounted relative to the shaft, a one-way clutch between the first gear wheel and the shaft, a second gear wheel rotatably mounted relative to the housing and engaged with the first gear wheel, a first gear pump inlet to the first gear pump and a first gear pump outlet from the first gear pump;

a second gear pump having a third gear wheel rotatably mounted relative to the shaft, a second one-way clutch between the third gear wheel and the shaft, a fourth gear wheel rotatably mounted relative to the housing and engaged with the third gear wheel, a second gear pump inlet to the second gear pump and a second gear pump outlet from the second gear pump;

a fluid circuit including a fluid reservoir, having a variable volume, and a valve, the pump inlet being in communication with the reservoir, the pump outlet being in communication with the first gear pump inlet and the second gear pump inlet, the first gear pump outlet and the second gear pump outlet being in communication with the reservoir, the valve having a first valve element in the first gear pump outlet to selectively control flow therethrough.

41. The rotational output control system of claim 40, the pump shaft being rotatable with the shaft.

42. The rotational output control system of claim 41, the pump being a third gear pump having a fifth gear wheel rotatably mounted relative to the pump shaft, a sixth gear wheel mounted to the pump housing.

43. The rotational output control system of claim 42, the valve including a second valve element in the second gear pump outlet to selectively control flow therethrough.

44. The rotational output control system of claim 43, the housing being coupled with the pump housing.

* * * * *